United States Patent
Maki

(10) Patent No.: US 9,501,160 B2
(45) Date of Patent: Nov. 22, 2016

(54) COORDINATE DETECTION SYSTEM AND INFORMATION PROCESSING APPARATUS

(71) Applicant: Takashi Maki, Kanagawa (JP)

(72) Inventor: Takashi Maki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 14/472,484

(22) Filed: Aug. 29, 2014

(65) Prior Publication Data

US 2015/0077763 A1 Mar. 19, 2015

(30) Foreign Application Priority Data

Sep. 13, 2013 (JP) ................................ 2013-190395

(51) Int. Cl.
  G06F 3/042 (2006.01)
  G06F 3/03 (2006.01)
  G06F 3/033 (2013.01)
  G06F 3/0354 (2013.01)

(52) U.S. Cl.
  CPC ......... G06F 3/03545 (2013.01); G06F 3/0428 (2013.01); *G06F 3/03* (2013.01); *G06F 3/033* (2013.01); *G06F 3/042* (2013.01)

(58) Field of Classification Search
  CPC ............ G06K 7/10594; G06K 7/10732; G06K 9/0014
  USPC ..................... 356/237.1–241.6, 242.1–243.8, 356/426–431, 600–640
  See application file for complete search history.

(56) References Cited

U.S. PATENT DOCUMENTS

| | | | |
|---|---|---|---|
| 6,104,327 A | 8/2000 | Maki | |
| 6,239,789 B1 * | 5/2001 | Sekizawa | G06F 3/038 345/173 |
| 6,370,667 B1 | 4/2002 | Maki | |
| 7,310,447 B2 | 12/2007 | Yano et al. | |
| 7,315,651 B2 | 1/2008 | Sakuyama et al. | |
| 7,333,664 B2 | 2/2008 | Sakuyama et al. | |
| 7,359,549 B2 | 4/2008 | Ikebe et al. | |
| 7,406,202 B2 | 7/2008 | Kodama et al. | |
| 7,409,095 B2 | 8/2008 | Sakuyama et al. | |
| 7,433,523 B2 | 10/2008 | Sakuyama et al. | |

(Continued)

FOREIGN PATENT DOCUMENTS

| | | |
|---|---|---|
| JP | 2005-031755 | 2/2005 |
| JP | 4112878 | 7/2008 |

*Primary Examiner* — Kara E Geisel
*Assistant Examiner* — Jarreas C Underwood
(74) *Attorney, Agent, or Firm* — IPUSA, PLLC

(57) ABSTRACT

A coordinate detection system that detects a coordinate pointed by a pointing operation on a board face includes at least two light receiving units that receive a light emitted from a peripheral light emission part provided in a periphery of the board face; and a coordinate detecting unit that detects the coordinate pointed by the pointing operation based on a comparison between a first intensity distribution and a second intensity distribution, wherein the first intensity distribution is obtained by the at least two light receiving units of receiving the light emitted from the peripheral light emission part without an interruption of the light caused by the pointing operation, wherein the second intensity distribution is obtained by the at least two light receiving units of receiving the light emitted from the peripheral light emission part when the pointing operation points the board face.

18 Claims, 19 Drawing Sheets

(56) References Cited

U.S. PATENT DOCUMENTS

| | | | |
|---|---|---|---|
| 7,440,624 B2 | 10/2008 | Kodama et al. | |
| 7,454,069 B2 | 11/2008 | Kodama et al. | |
| 7,465,914 B2 * | 12/2008 | Eliasson | G06F 3/0414 250/221 |
| 7,505,630 B2 | 3/2009 | Sakuyama et al. | |
| 7,526,144 B2 | 4/2009 | Maki et al. | |
| 7,538,894 B2 * | 5/2009 | Kobayashi | G06F 3/0416 345/175 |
| 7,626,733 B2 | 12/2009 | Kodama et al. | |
| 8,089,549 B2 | 1/2012 | Yasuda et al. | |
| 8,115,821 B2 | 2/2012 | Maki et al. | |
| 8,155,511 B2 | 4/2012 | Maki | |
| 8,553,014 B2 * | 10/2013 | Holmgren | G06F 3/0421 345/173 |
| 8,760,540 B2 | 6/2014 | Maki et al. | |
| 8,854,338 B2 * | 10/2014 | Omura | G06F 3/0418 178/18.09 |
| 8,902,196 B2 * | 12/2014 | Goertz | G06F 3/0416 345/173 |
| 9,342,189 B2 * | 5/2016 | Kuboyama | G06F 3/0425 |
| 2004/0095477 A1 | 5/2004 | Maki et al. | |
| 2004/0208380 A1 | 10/2004 | Aoki et al. | |
| 2004/0212843 A1 | 10/2004 | Kodama et al. | |
| 2005/0151854 A1 | 7/2005 | Maki | |
| 2008/0225146 A1 | 9/2008 | Maki | |
| 2012/0069234 A1 | 3/2012 | Yasuda et al. | |

* cited by examiner

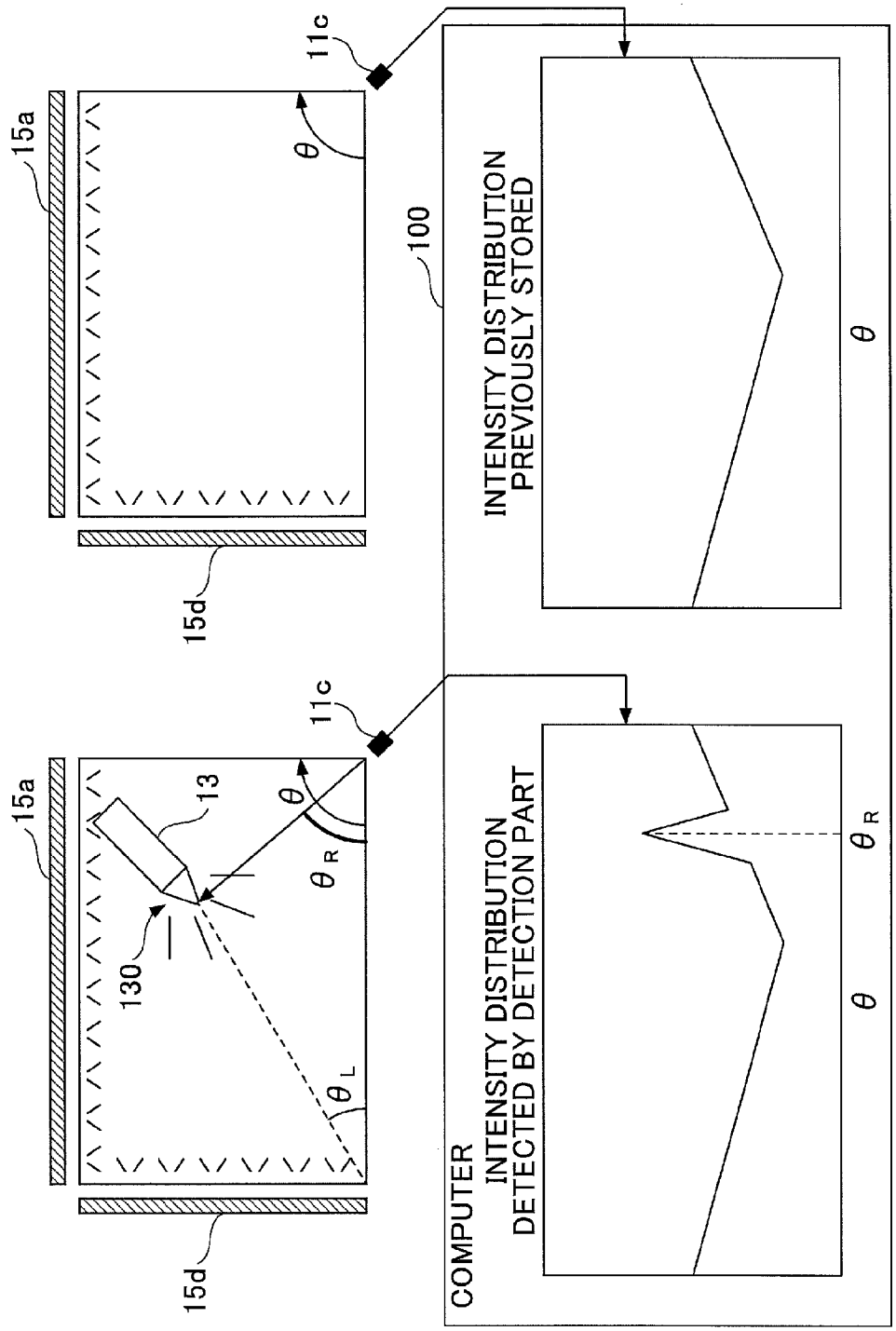

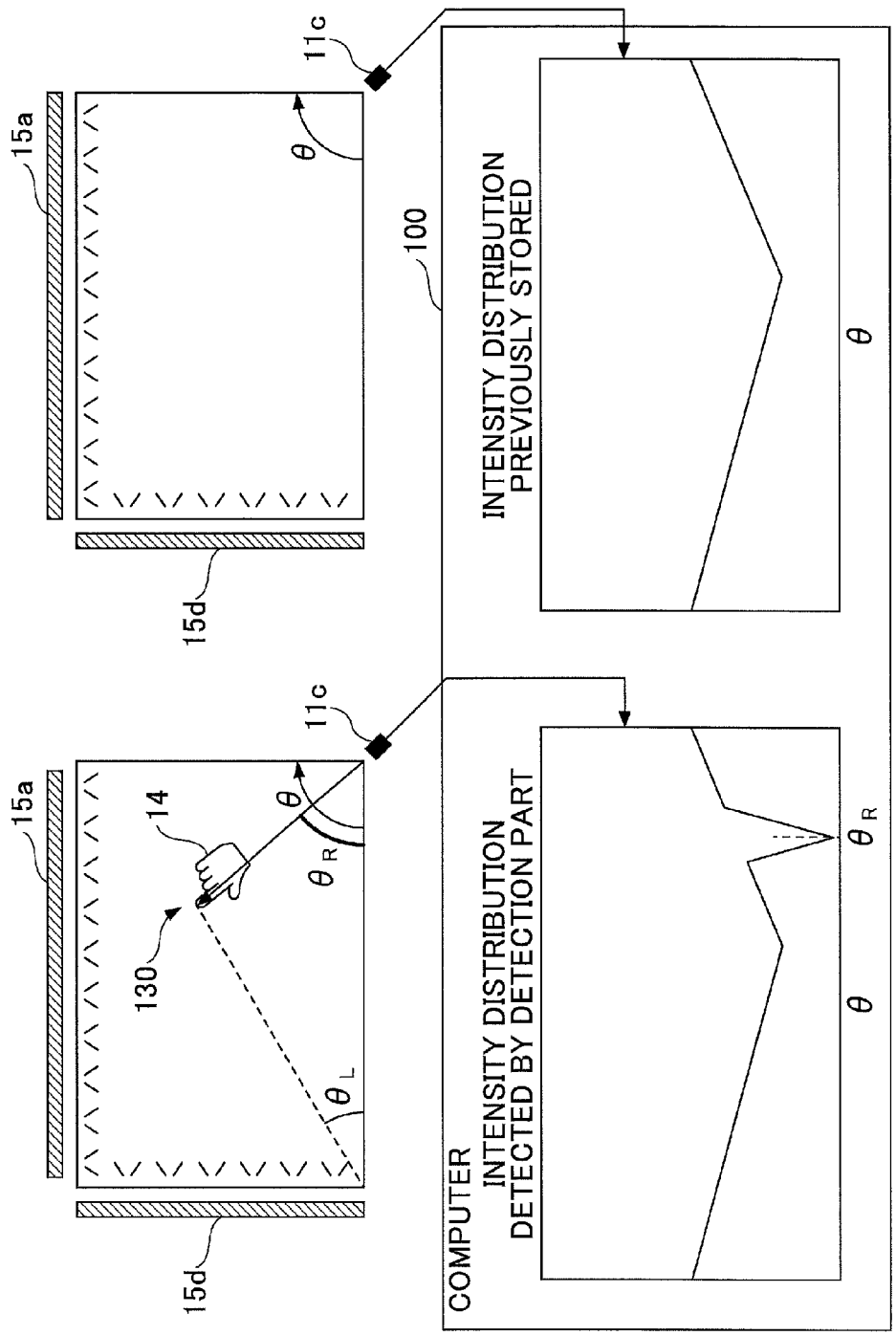

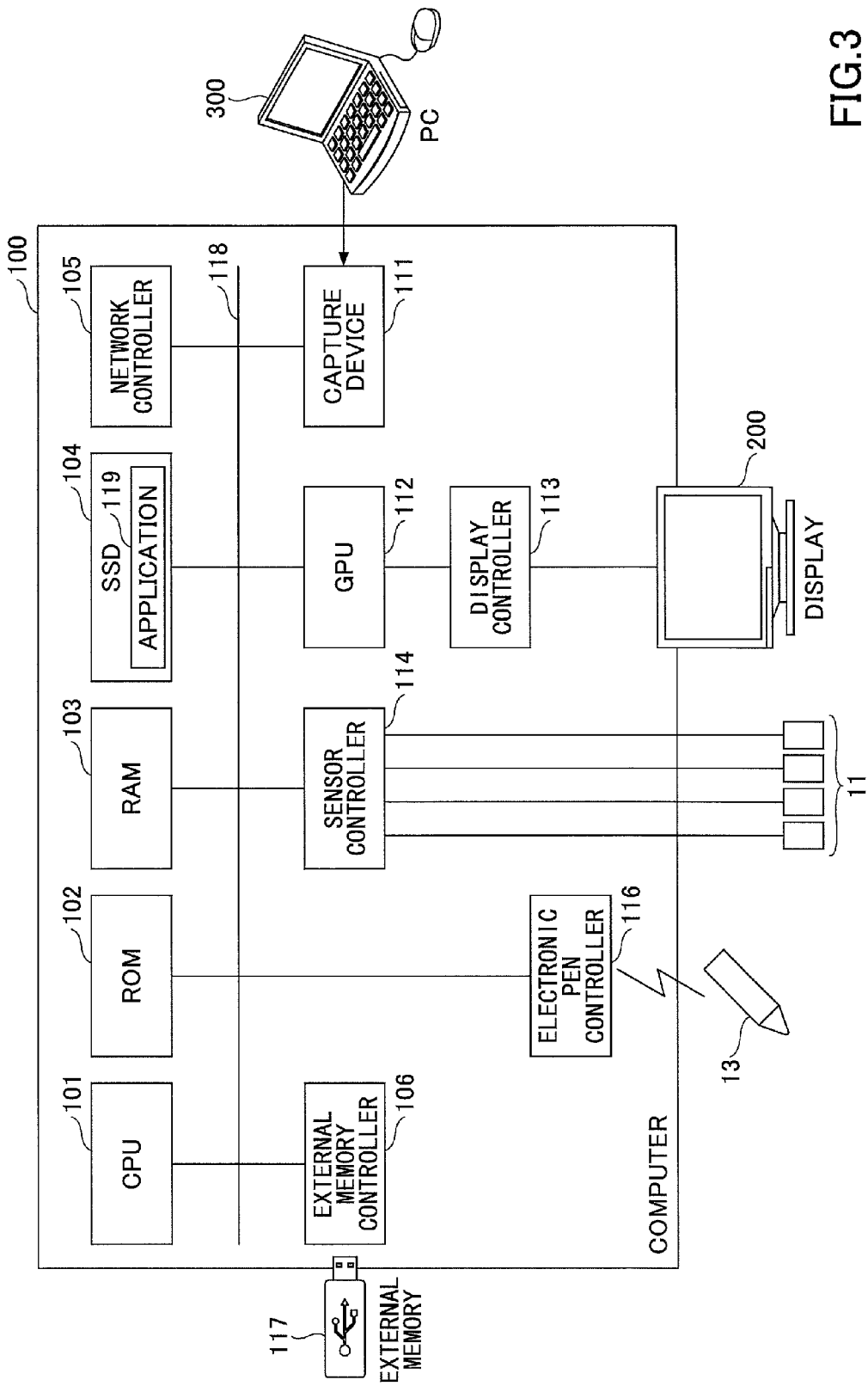

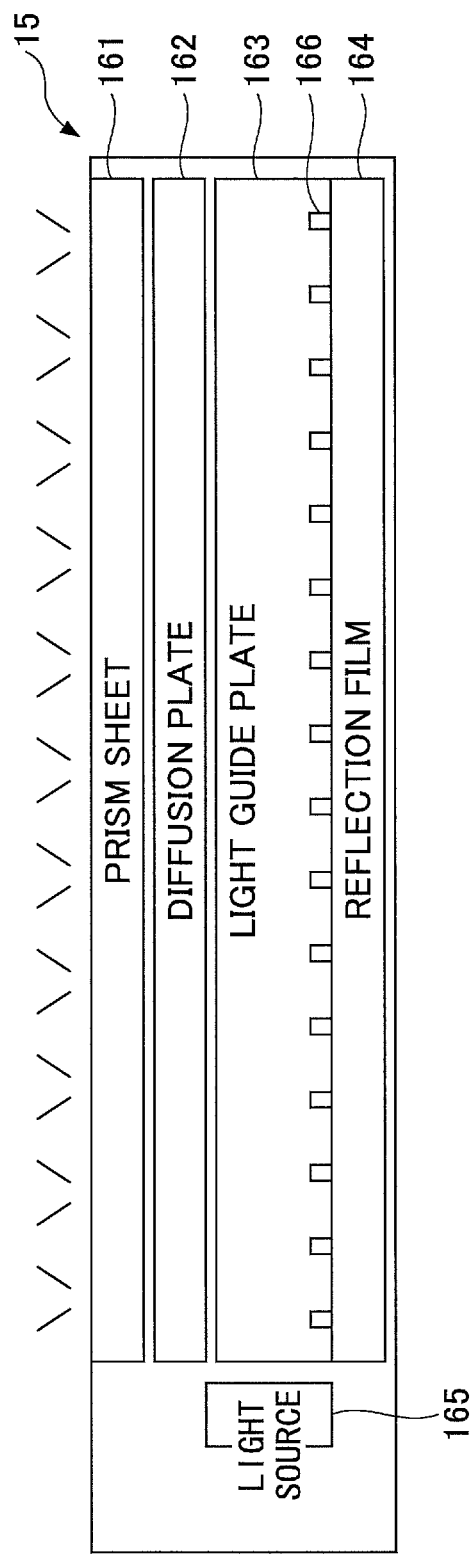

FIG.12
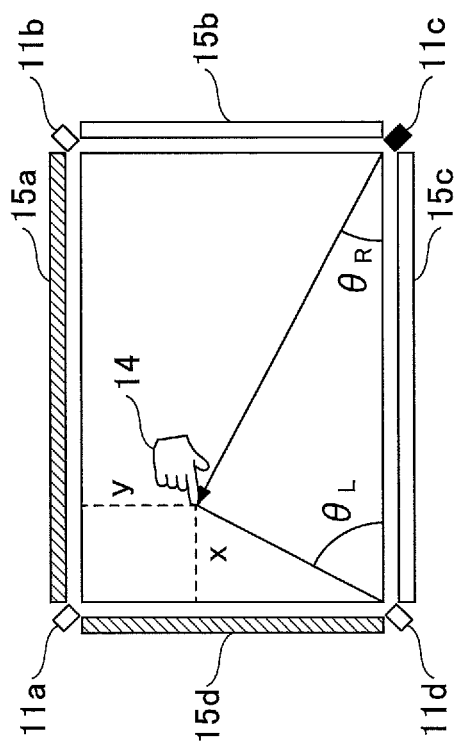
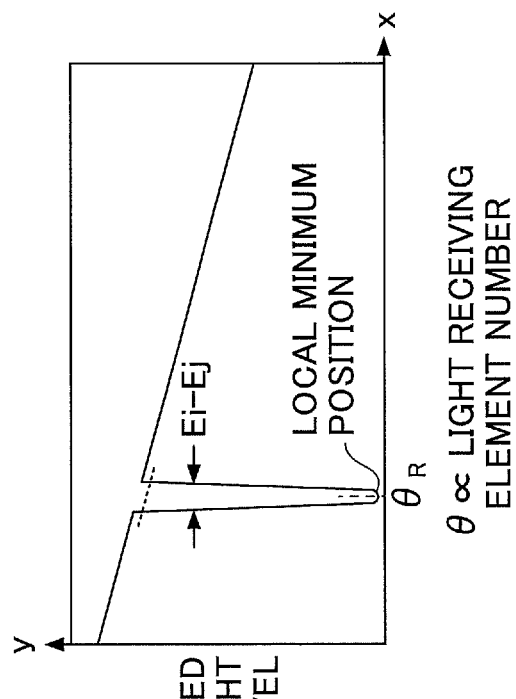

FIG.15
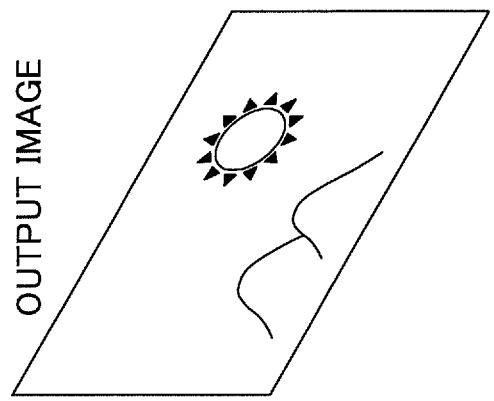
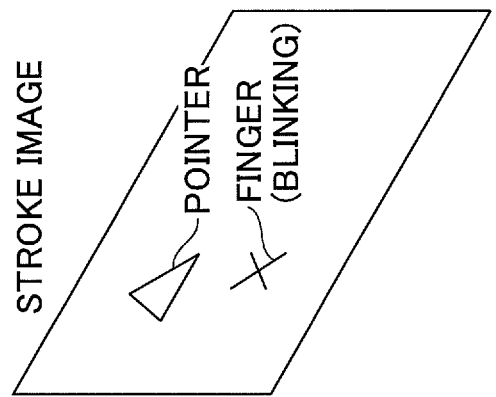
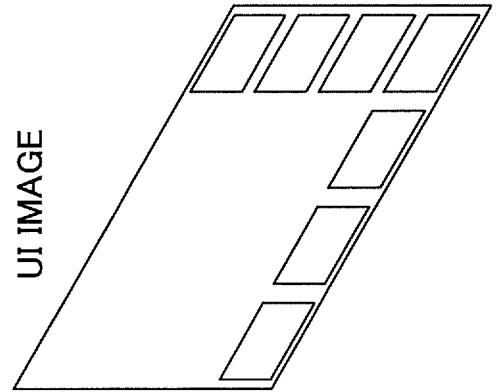

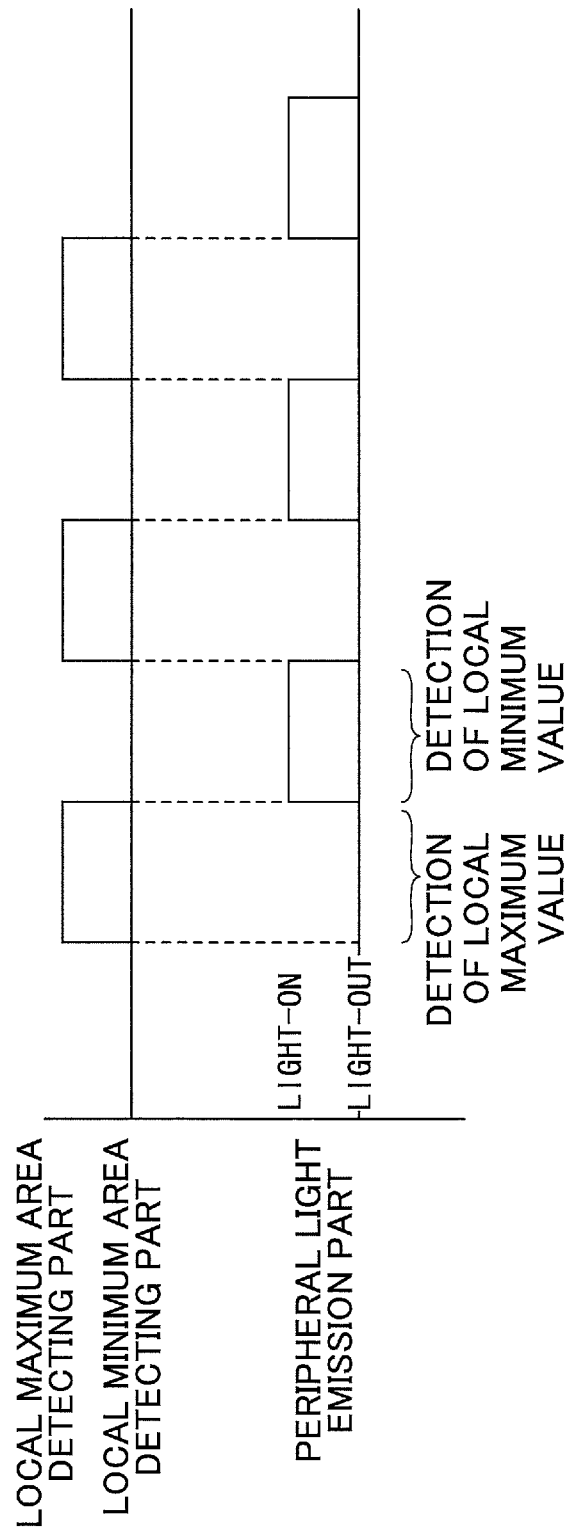

COORDINATE DETECTION SYSTEM AND INFORMATION PROCESSING APPARATUS

BACKGROUND OF THE INVENTION

1. Field of the Invention

The present invention relates to, for example, a coordinate detection system that detects a coordinate indicated on a board face by a pointer or a finger.

2. Description of the Related Art

As one coordinate input unit used for an electronic copyboard, a method of triangulation using an interruption of an infrared ray is known. In the method of triangulation using the interruption of the infrared ray, it is unnecessary to prepare a display, on which a touch panel is installed, and an arbitrarily selected wall can be used as a screen for drawing, for example. For example, when a whiteboard is used as a screen, the coordinate of a pointer shaped like a pen, which is grasped by a user for handwriting, is acquired.

However, in a case where a user handwrites characters or the like on a board face, there is a case where a part of a hand carelessly touches the board face. In the method of triangulation using the interruption of the infrared ray, the light is interrupted to detect the coordinate. Therefore, in a case where the hand grasping the pointer touches the board face, both the pointer and the hand are detected as an interrupting object. Therefore, there may be a case where the coordinate of the pointer cannot be correctly detected.

As one measure of solving this inconvenience, Japanese Laid-open Patent Publication No. 2005-31755 discloses that a switch that is turned on when writing pressure is applied is installed at a tip end of the pointer, it is distinguished whether the hand or the pointer interrupts the light depending on whether the switch is turned on or off when the light is interrupted, and the coordinate of the tip end of the pointer is detected when the switch is turned on.

Further, Japanese Patent No. 4112878 discloses a technique of detecting the coordinate of the pointer without using the interruption of the infrared ray in order to prevent the finger from being detected as the interrupting object. According to Japanese Patent No. 4112878, the coordinate is detected by installing the light source on the tip end of the pointer, and the finger is prevented from being detected as the interrupting object.

However, if a special pointer is necessary as disclosed in Japanese Laid-open Patent Publication No. 2005-31755 or Japanese Patent No. 4112878, in a case where the special pointer does not exist or the special pointer is out of order, there is a problem that the electronic copyboard cannot be used. Further, according to Japanese Laid-open Patent Publication No. 2005-31755, a pen signal receiving part of receiving a signal indicative of whether the switch is turned on or off from the pointer is necessary on a side of a control part. Therefore, there is a problem that the structure becomes complicated and the manufacturing cost increases more.

SUMMARY OF THE INVENTION

It is an object of at least one embodiment of the present invention to provide a coordinate detection system enabling a detection of a coordinate pointed on a board face irrespective of a use of a pointer that substantially obviates one or more problems caused by the limitations and disadvantages of the related art.

One aspect of the embodiments of the present invention may be to provide a coordinate detection system that detects a coordinate pointed by a pointing operation on a board face including at least two light receiving units that receive a light emitted from a peripheral light emission part provided in a periphery of the board face; and a coordinate detecting unit that detects the coordinate pointed by the pointing operation based on a comparison between a first intensity distribution and a second intensity distribution, wherein the first intensity distribution is obtained by the at least two light receiving units of receiving the light emitted from the peripheral light emission part without an interruption of the light caused by the pointing operation, wherein the second intensity distribution is obtained by the at least two light receiving units of receiving the light emitted from the peripheral light emission part when the pointing operation points the board face Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIGS. 2A and 2B schematically illustrate a coordinate detection in the coordinate detection system of an embodiment;

FIG. 3 illustrates an exemplary hardware structure of a computer;

FIG. 9 schematically illustrates the structure of the peripheral light emission part;

FIG. 12 illustrates an exemplary light intensity distribution in a case where, for example, a finger other than the pointer interrupts the light;

FIG. 15 schematically illustrates a combination of an UI image displayed on a display, a stroke image, and an output image;

FIG. 17 is an exemplary sequential chart illustrating a relationship between a light-on cycle of a peripheral light emission part and a cycle of detecting a local maximum area detecting part and a local minimum area detecting part.

DETAILED DESCRIPTION OF THE PREFERRED EMBODIMENTS

A description is given below, with reference to the FIG. 1 through FIG. 18 of embodiments of the present invention. Where the same reference symbols are attached to the same parts, repeated description of the parts is omitted.

Reference symbols typically designate as follows:
11: detection part;
13: pointer;
14: finger;
15: peripheral light emission part;
21: local maximum area detecting part;
22: local minimum area detecting part;
23: peak position extraction part;
24: local minimum position extraction part;
25: coordinate calculation part;
100: computer;
20: display;
300: PC;
500: coordinate detection system.

First Embodiment

Figure 1:
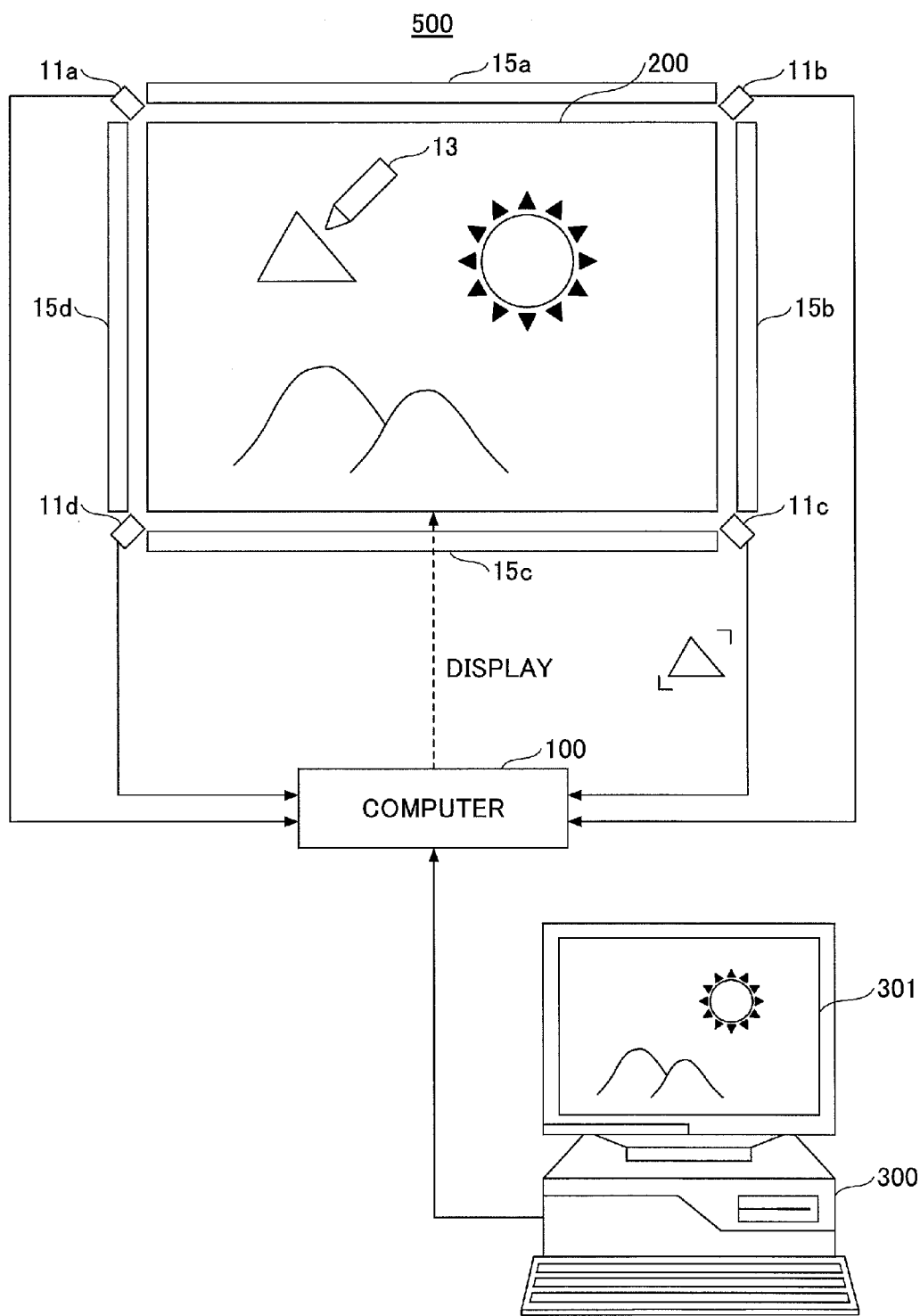
FIG. 1 illustrates an exemplary system structure of a coordinate detection system.

FIG. 1 illustrates an exemplary system structure of a coordinate detection system. A coordinate detection system 500 includes a display 200, four detection parts 11a-11d (a detection part 11 in a case where an arbitrary at least one detection part is designated), four peripheral light emission parts 15a-15d (a peripheral light emission part 15 in a case where an arbitrary at least one detection part is designated), a computer 100, and a Personal Computer (PC) 300.

The four peripheral light emission parts 15a-15d are arranged in a periphery of the display 200 or installed so as to be attachable or detachable. The PC 300 is connected to the computer 300. The computer 100 can display an image output by the PC 300 on the display.

An application 119 (see FIG. 3) corresponding to the coordinate detection system 500 is installed in the computer 100. The application 119 detects a position where the user operates based on a signal received from the detection part 11. The application analyzes a gesture based on the position to control the computer 100. The application can display a menu for operation on the display 200.

For example, in a case where the user draws a graphic on a board face of the display 200 using the pointer 13 after the user touches a menu of drawing a line, the computer 100 analyzes the position where the pointer 13 touches and produces coordinates in time series. The computer 100 produces a line by connecting these coordinates in time series and displays the line on the display. Referring to FIG. 1, the user moves the pointer 13 along a locus in a shape of triangle. Therefore, the computer 100 records the sequential coordinates as one stoke (a triangle). Then, these sequential coordinates are combined with an image on the PC 300, and displayed.

As described, even if the display 200 does not have a function as a touch panel, by applying the coordinate detection system 500, the user can perform various operations by touching the display 200 with the pointer 13. Further, as described later, the user can input a position using a finger without using the pointer 13.

[Summary of Coordinate Detection System]

FIG. 2 schematically illustrates a coordinate detection in the coordinate detection system of the first embodiment. The computer 100 holds an intensity distribution of a peripheral light emission part 15 that is detected by the detection part 11 (only the detection part 11c is illustrated in FIG. 2A) as illustrated in the right half of FIG. 2A. An x-axis has an angle θ from a side of the display (i.e., the bottom side in the upper half of FIG. 2A). In a case where there is nothing on the board face, the intensity distribution is as illustrated on the right half of FIG. 2A.

The pointer 13 of the first embodiment includes a tip light emission part 130. The tip light emission part 130 emits a light by a pressure caused when a tip end of the pointer 13 touches the board face. In a case where the tip light emission part 130 of the pointer 13 emits the light, the intensity distribution of the light detected by the detection part 11c is as illustrated in the left half of FIG. 2A. Said differently, the light intensity at the position where the tip end of the pointer 13 exists becomes higher than the light intensity caused by the peripheral light emission part 15 because the light emitted by the pointer 13 overlaps the light emitted by the peripheral light emission part 15.

The computer 100 compares the previously stored intensity distribution and the intensity distribution detected by the detection part 11c to thereby detect an increased portion of an emission intensity caused by pointer 13. With this, a position (an angle) θR of the pointer 13 can be specified.

FIG. 2B schematically illustrates an exemplary coordinate detection in a case where the user inputs the position using the finger 14 without using the pointer 13. In a manner similar to FIG. 2A, the computer 100 stores the intensity distribution of the peripheral light emission part 15 that is detected by the detection part 11 (only the detection part 11c is illustrated in FIG. 2B) as illustrated in FIG. 2B.

In a case where the user touches the board face by the finger 14, the intensity distribution detected by the detection part 11c is as illustrated in the left half of FIG. 2B. Said differently, the light intensity at a position where the light from the peripheral light emission part 15 is interrupted by the tip end of the finger 14 becomes lower than the corresponding light intensity caused by the peripheral light emission part 15.

The computer 100 compares the previously stored intensity distribution and the intensity distribution detected by the detection part 11c to thereby detect a decreased portion of the emission intensity caused by finger 14. With this, a position (an angle) θR of the finger 14 can be specified.

The finger 14 is a pointer other than the pointer 13 having the tip light emission part 130 and includes a finger, a pen tail, a pointer without the tip light emission part 130, and so on. Said differently, it is sufficient that the finger 14 interrupts the light from the peripheral light emission part 15 without emitting the light.

<Hardware Structure>

FIG. 3 illustrates an exemplary hardware structure of the computer 100. The computer 100 is an information processing apparatus developed for a commercially available information processing apparatus or a coordinate detection system. The computer 100 includes a CPU 101, a ROM 102, a RAM 103, an SSD 104, a network controller 105, an external memory controller 106, a sensor controller 114, a GPU 12, and a capture device 111, which are electrically connected through a bus line 118 such as an address bus or a data bus.

The CPU 101 controls an entire operation of the coordinate detection system 500 by performing the application. The ROM 102 stores an IPL or the like and mainly stores a program run by the CPU 101 at a time of starting up the computer 100. The RAM 103 is a work area where the CPU 101 runs the application. The SSD 104 is a nonvolatile memory where the application 119 for the coordinate detection system and various data are stored. The network controller 105 performs a process based on a communication protocol when the computer 100 communicates with a server through a network (not illustrated). The network is a LAN or a WAN (e.g., the Internet) where multiple LANs are connected.

The external memory controller 106 writes in the external memory 117 which is attachable and detachable and reads out of the external memory 117. The external memory 117 is, for example, a USB memory, an SD card, or the like. The capture device 111 takes in (captures) an image displayed by the PC 300 on a display device 301. The GPU 112 is a processor that operates the pixel value for each pixel in the display 200. The display controller 113 outputs the image produced by the GPU 112 onto the display 200.

The sensor controller 114 is connected to the four detection parts 11a to 11d to detect the coordinate by the method of triangulation using the interruption of the infrared ray. The detailed explanation is given below.

Figure 6:
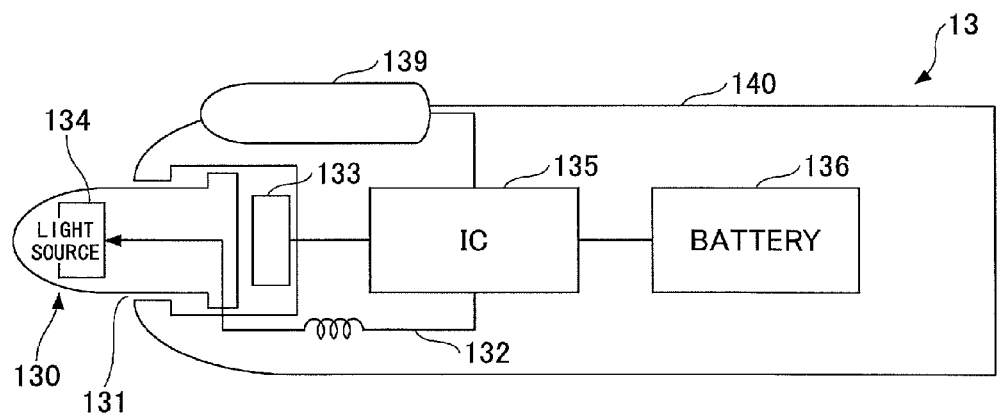
FIG. 6 illustrates another exemplary structure of the pointer.

Within the first embodiment, the computer 100 needs not communicate with the pointer 13. However, the computer 100 and the pointer 131 may have a communication function. In this case, as illustrated in FIG. 3, the computer 100 includes an electronic pen controller 116, which receives a pressure signal from the pointer 13 by a report unit 139 provided in the pointer 13 as illustrated in FIG. 6. Thus, the computer 100 can detect whether the tip end of the pointer 13 is pushed.

The application for the coordinate detection system may be put into circulation while the application is stored in the external memory 117 or may be downloaded from a server (not illustrated) through the network controller 105. The application may be in a compressed state or in an executable format.

Figure 4:
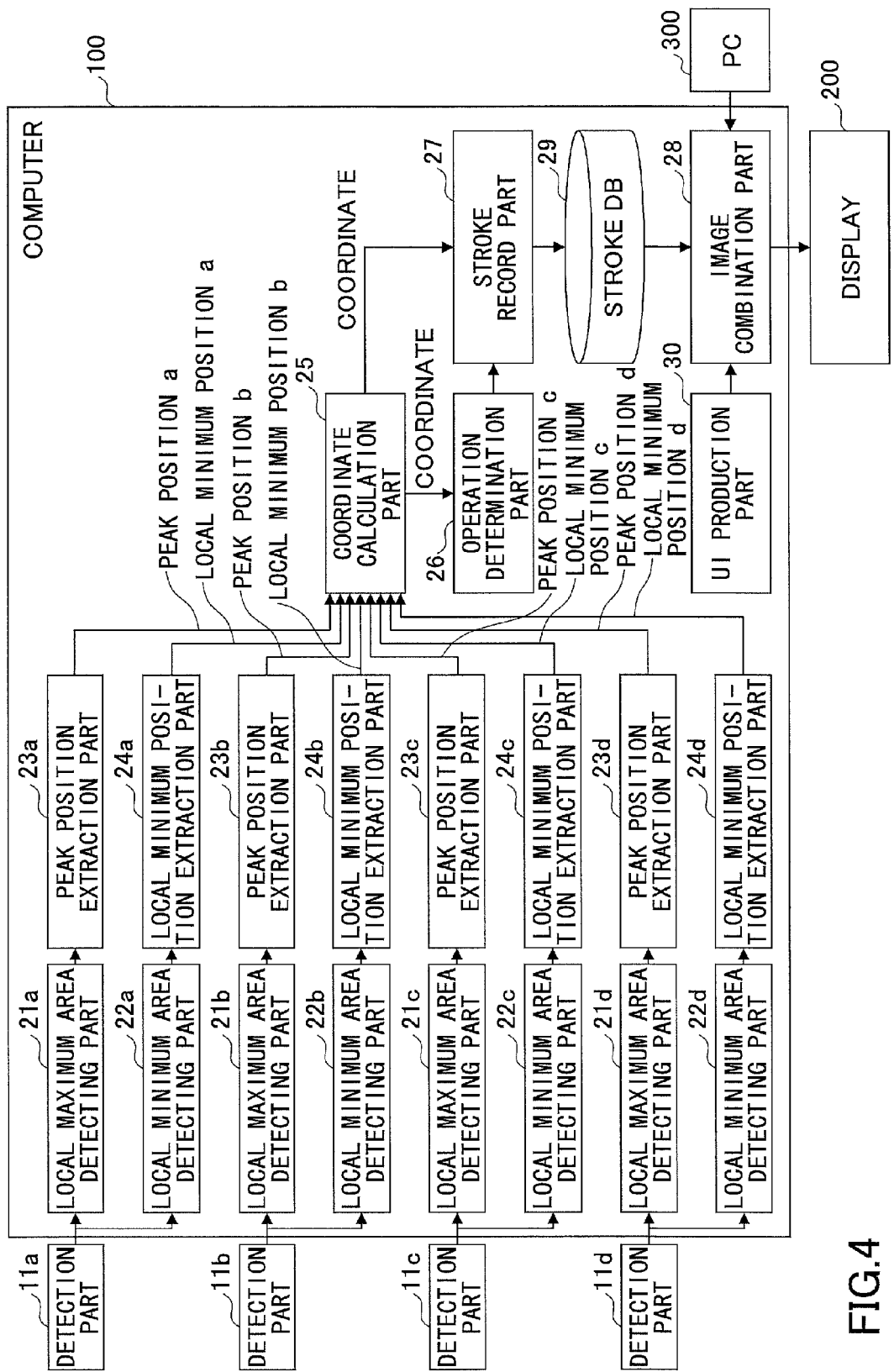
FIG. 4 illustrates an exemplary functional block chart of the computer.

FIG. 4 illustrates an exemplary functional block chart of the computer. The illustrated function is substantialized when the CPU 101 runs the application or collaborates with hardware such as a resource of the computer 100.

The computer 100 includes a local maximum area detecting part 21, a local minimum area detecting part 22, a peak position extraction part 23, and a local minimum position extraction part 24 for each detection part 11. Suffixes a, b, c, and d attached to the reference symbols of the local maximum area detecting part 21, the local minimum area detecting part 22, the peak position extraction part 23, and the local minimum position extraction part 24 correspond to detection part 11a, 11b, 11c, and 11d, respectively. Hereinafter, these suffixes a, b, c, and d are omitted.

The local maximum area detecting part 21 detects an area where the received light level detected by the detection part 11 is greater than a threshold. Said differently, a light receiving element that detects light emitted by the tip light emission part 130 of the pointer 13 is roughly specified. The peak position extraction part 23 specifies the light receiving element whose received light level has a peak from the area detected by the local maximum area detecting part 21 and outputs the specified light receiving element to the coordinate calculation part 25. For example, the light receiving element at the center of the area where the received light levels continuously exceed the threshold may be determined as the peak position. For example, the light receiving element having the highest received light level in an area continuously exceed the threshold may be determined as the peak position. The light receiving elements may be identified using light receiving element numbers.

The other three local maximum area detecting parts 21 and the other three peak position extraction parts 23 specify the light receiving elements whose received light level has the peak and output the specified light receiving elements to the coordinate calculation part 25.

The local minimum area detecting part 22 detects an area where the received light level detected by the detection part 11 is smaller than a threshold. Said differently, the light receiving element whose received light level is lowered by an interruption with the finger 14 or the like of the light emitted from the peripheral light emission part 15 is roughly specified. The local minimum position extraction part 24 specifies the light receiving element whose received light level is a local minimum from the area detected by the local minimum area detecting part 22 and outputs the specified light receiving element to the coordinate calculation part 25. For example, the light receiving element at the center of the area where the received light levels are continuously lower than the threshold is determined as the local minimum position.

The other three local minimum area detecting parts 22 and the other three local minimum position extraction parts 24 specify the light receiving elements whose received light level is the local minimum and output the specified light receiving elements to the coordinate calculation part 25.

The coordinate calculation part 25 calculates the coordinate at the position of the pointer 13 of the finger 14 on the display by a method of triangulation. In this method of triangulation, the peak position detected by adjacent detection parts 11 and extracted by the peak position extraction part 23 is used. Therefore, the coordinate calculation part 25 calculates the coordinate where the received light level is the peak using peak positions a and b, calculates the coordinate where the received light level is the peak using peak positions c and d, and calculates the coordinate where the received light level is the peak using peak positions d and a. The local minimum position can be calculated in a manner similar thereto. The calculation of the coordinate using the method of triangulation will be described in detail below.

Referring to FIG. 4, the numbers of the local maximum area detecting parts 21, the peak position extraction parts 23, the local minimum area detecting parts 22, and the local minimum position extraction parts 24 are the same as the number of the detection parts 11. As the structure of software, each group of the local maximum area detecting part 21, the peak position extraction part 23, the local minimum area detecting part 22, and the local minimum position extraction part 24 can be time-shared so as to correspond to each detection part 11.

The coordinate calculated by the coordinate calculation part 25 is output to an operation determination part 26 and a stroke record part 27. The operation determination part 26 specifies the user operation by detecting a gesture such as a tap, a pinch, a drag, or the like from the position of the coordinate. In a case where the coordinate corresponds to the position of a menu displayed as a user interface (UI) and a specific gesture is detected, the menu selected by the coordinate is received. Further, in a case other than this menu operation, the stroke record part 27 records the coordinates cyclically detected as one stroke as much as one line in stroke DB. The stroke DB 29 stores stroke data drawn on each page, for example. One stroke data is a group of coordinates as much as one line. A color or a line width may be recorded in addition to the coordinates in the stroke DB 29. Within the first embodiment, it is possible to record whether the pointer 13 or the finger 14 is used for the drawing. Using this information, it is possible to change a display mode of the stroke in displaying the stroke on the display 200.

The UI production part 30 produces an UI image previously set to the application. An image combination part 28 combines stroke data for one page, a UI image produced by the UI production part 30, and the output image taken in from the PC 300 by overlapping these as layers, and displays the combined on the display 200. By combining and displaying as such, the stroke can be overlapped on the output image of the PC 300.

[Pointer]

Figure 5A:
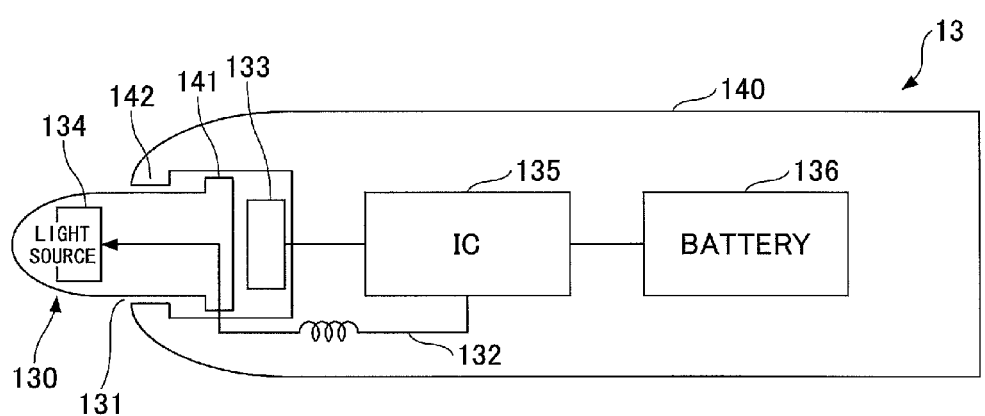
FIGS. 5A and 5B illustrate exemplary structures of a pointer.

FIG. 5A illustrates an exemplary pointer 13. The pointer 13 mainly includes a movable part 131, a pressure sensor 133, and a grip 140. Instead of an effusion part of effusing an ink in a marker pen used by a user for handwriting on a whiteboard or in addition to this effusion part, a movable part 131 is provided. The movable part 131 includes in the vicinity of its tip end a tip light emission part 130, in which a light source 134 is accommodated in a plastic, a glass, or the like for transmitting an infrared light, preferably a visible light.

The wavelength of a light emitted by the light source 13 corresponds to a range of a wavelength that the detection part can detect. For example, an infrared light can be used. In a case where the infrared light is used, even if the light source 134 emits the light, the user and a viewer cannot see the light. The wavelength of the light emitted by the light source 134 may be that of a visible light. In a case where the visible light is used, the user can check light-on or light-out of the light. A light emission part of emitting the visible light may be provided at a position other than the position of the tip light emission part 130, such as a tail of the pointer 13. With this, the user can check the light-on of the pointer 13 by observing the visible light. The light source 134 of the tip light emission part 130 is, for example, a LED and may be an electric bulb or the like.

The movable part 131 is accommodated inside a hollow part at an end part of the grip 140 so as to be slidable in an axial direction of the grip 140. At an end part of the movable part 131 on a side of the grip 140, a protrusion 141 is formed along a periphery of the movable part 131 so as to be engaged with an opening 142 of the hollow part of the grip 140. Therefore, the movable part 131 can move between the pressure sensor 133 and the opening 142 in the direction of the axis of the grip 140.

The grip 140 includes an IC 135 connected with the pressure sensor 133 and a battery 136 for supplying electric power to the pointer 13. The pressure sensor 133 detects a pressure pressing the pressure sensor 133 by the movable part 131. When a pressure equal to or greater than a threshold is detected, a turn-on signal is output to the IC 135. Therefore, when the user grasps the pointer 13 and draws a line on the board face, a pressure equal to or greater than the threshold is generated in the pressure sensor 133. Then, the IC 135 can detect the turn-on signal.

The IC 135 and the light source 134 are connected through a power supply line 132. When the IC 135 detects the turn-on signal, the light source 134 is turned on through the power supply line 132. When the turn-on signal is not detected by the IC 135, the light source 134 is turned off. Therefore, only while the user draws the line using the pointer 13, the light source 134 is turned on.

Figure 5B:
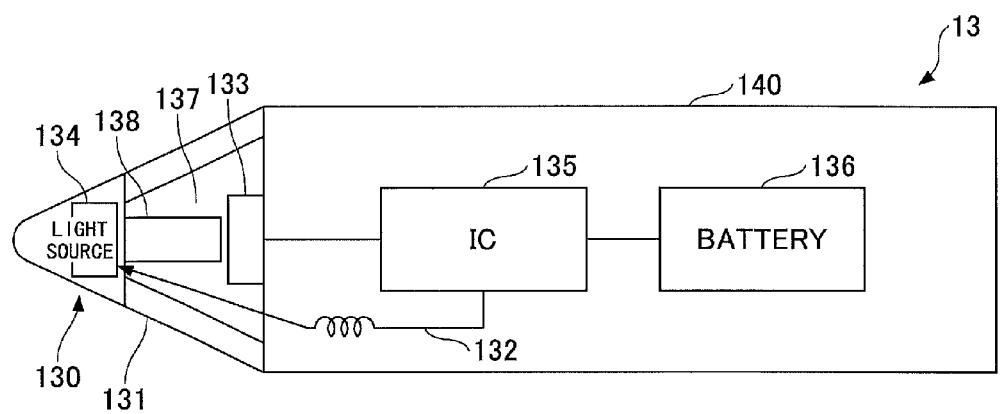

FIG. 5B illustrates another structural example of the pointer 13. Referring to FIG. 5B, the movable part 131 is formed by a retractable or deformable component. A cavity 137 is formed inside the movable part 131. The movable part 131 is retractable or deformable by using the cavity 137. The movable part 131 enables the tip light emission part 130 to approach the grip 140 when a pressure is applied to the tip end of the movable part 131. The movable part 131 is made of a rubber, an elastomer, a spring retractable in the axial direction of the grip, a retractable net, or the like.

The light source 134 is installed in the tip light emission part 130. The power supply line 132 passes through the hollow part and connects the light source 134 to the IC 135. A cylindrical part 138 is provided in the tip light emission part 130 so as to extend in the axial direction of the pointer 13. When a writing pressure is applied to the pointer 13 after the user starts drawing, the movable part 131 is deformed so that the cylindrical part 138 pushed the pressure sensor 133. Then a pressure equal to or greater than the threshold is applied to the pressure sensor 133 and the IC 135 detects the turn-on signal. After the user finishes drawing, the movable part 131 returns to an original shape. Therefore, the cylindrical part 138 is separated from the pressure sensor 133.

When the IC 135 detects the turn-on signal, the light source 134 is turned on through the power supply line 132. When the turn-on signal is not detected by the IC 135, the light source 134 is turned off. Therefore, only while the user draws the line using the pointer 13, the light source 134 is turned on.

The shape of the movable part 131 is only an example. It is sufficient that the movable part 131 is structured to be retractable or deformable in order to detect the pressure.

Further, the light source 134 may be turned on so that the user can unintentionally or intentionally turn on a switch that is provided in a grip when the user draws a line instead of the light-on of the LED caused by the detection of the writing pressure using the pressure sensor 133. This switch may be a pressure sensor like the pressure sensor 133.

As described, because the tip light emission part 130 emits the light, the detection part can detect the coordinate during the drawing.

FIG. 6 illustrates another exemplary structure of the pointer 13. The pointer 13 illustrated in FIG. 6 includes a report unit 139 in addition to the structure illustrated in FIG. 5A. The report unit 139 is, for example, a device of generating electromagnetic waves, a device of generating acoustic waves, a device of emitting a light having a wavelength different from that of the tip light emission part 130, or the like.

The IC 135 constantly causes the tip light emission part 13 to emit the light when a power switch (not illustrated) is turned on regardless of the pressure in the tip end of the IC 135. Further, when the tip light emission part 130 is pressed in a manner similar to FIG. 5A, the IC 135 detects that the drawing is being performed. When the IC 135 detects the turn-on signal, the IC 135 controls the report unit 139 so that the report unit 139 emits at least one of electromagnetic waves, acoustic waves, or a light. The electronic pen controller 116 of the computer 100 detects that transcription is being performed by the report from the report unit 139.

Because of this structure, it is possible not only to detect that the transcription is performed using information other than the information received from the tip light emission part 130 but also to acquire the coordinate of the pointer 13 using the light emission from the tip light emission part 130 when the transcription is not performed. Thus, the user can use the pointer 13 for a usage other than the transcription. For example, in a state where the pressure does not act on the tip end of the pointer 14, the operation determination part 26 receives an operation of designating the area. While the pressure acts on the tip end of the pointer 14, the stroke record part 27 receives an operation of recording the stroke. Meanwhile, the report unit 139 illustrated in FIG. 6 may be installed in the pointer 13 illustrated in FIG. 5B.

[Exemplary Structure of Electronic Copyboard]

Figure 7:
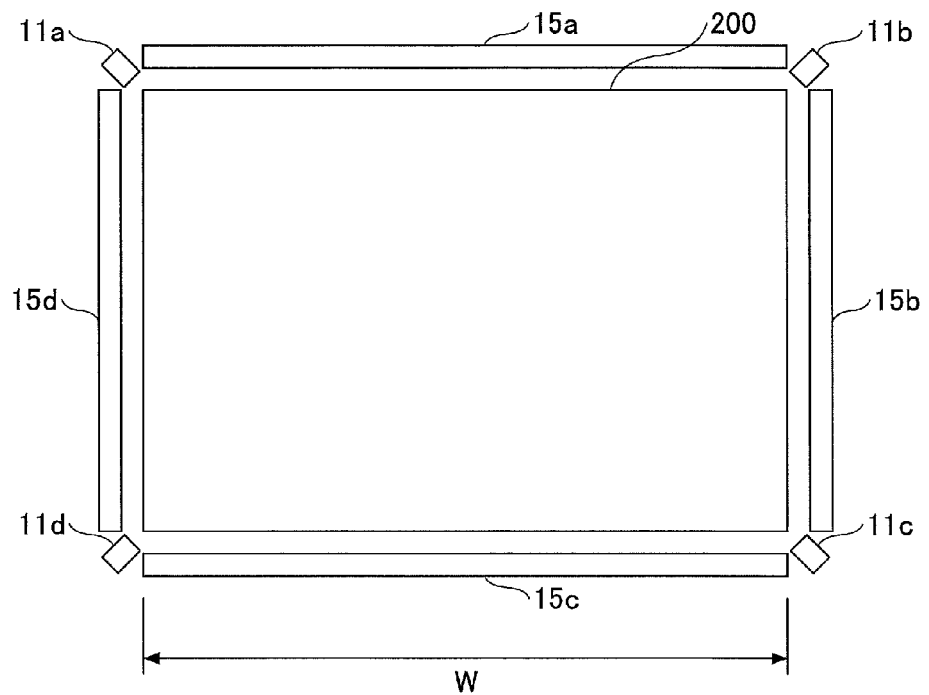
FIG. 7 illustrates an exemplary system structure of a coordinate detection system.

FIG. 7 illustrates an exemplary system structure of a coordinate detection system. As described above, the electronic copyboard includes the detection parts 11 and peripheral light emission parts 15 and detects the coordinate of the pointer 13 or the finger 14 on the board face of the display 200. By arranging the detection parts 11 and the peripheral light emission parts 15 as illustrated in FIG. 7, the coordinate at an arbitrary position on the display can be detected. As described, in a use of the electronic copyboard, a range of the detection is set to be the same as a range of displaying an output of the computer 100 on the display 200. For this, the length of the peripheral light emission part 15 is set to correspond with the size of the display 200.

The peripheral light emission part 15 automatically starts lighting when the power source 500 is turned on. The peripheral light emission part 15 can be turned on or off independent from the power source of the coordinate detection system 500. The light intensity of the light emitted from the peripheral light emission part 15 is lower than the light intensity of the light emitted from the tip light emission part 130 of the pointer 13.

The wavelength of the light emitted from the peripheral light emission part 15 needs not be the same as the wavelength of the light emitted from the pointer 13. However, solid-state image sensors included in the detection parts 11 have sensitivity in the wavelength of the light emitted from the peripheral light emission part 15. For example, the wavelengths of the lights emitted from the pointer 13 and the peripheral light emission part 15 correspond to the range of the infrared light. However, even if the wavelength range corresponds to the range of the infrared light, a difference in the peak wavelengths can be permitted. In this case, the light emitted from the pointer 13 can be separated from the light emitted from the peripheral light emission part 15 based on the difference in the wavelengths. If it is possible to prevent a visible light emitted from other than the pointer 13 and the peripheral light emission part 15 from being received by the detection part 11, one or both of the light emitted from the pointer 13 or the light emitted from the peripheral light emission part 15 can be a visible light.

Referring to FIG. 7, the four detection parts 11 are arranged at four corners (vertices) of the display 200. This is an exemplary method of arranging the detection parts 11. The number of the detection parts 11 can be increased or decreased depending on conditions such as the number of the pointers 13 or the fingers, which are required to be simultaneously detected. According to the principle of triangulation, one coordinate can be detected by the two detection parts. Therefore, at least two detection parts 11 is necessary. In a case where three detection parts 11 are provided, one coordinate can be detected by the detection parts 11a and 11b, and one coordinate can be detected by the detection parts 11b and 11c. As such, in a case where the number of the detection parts is n, the coordinates as many as n−1 can be detected. Further, more than n−1 coordinates can be detected by using a mathematical process even if the number of the detection parts 11 is n.

A rod-like light emitter is included in each peripheral light emission part 15 so that the axial direction of the rod-like light emitter is arranged in parallel with a corresponding side of the display 200.

Figure 8A:
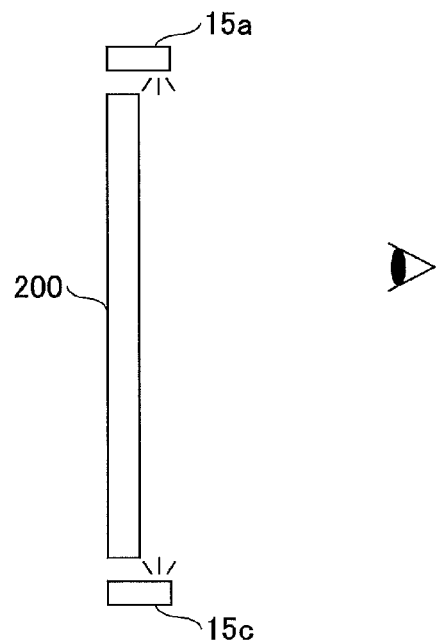
FIGS. 8A and 8B are exemplary side views of a peripheral light emission part and a display.

FIG. 8A is an exemplary side view of the peripheral light emission part 15 and the display 200. Referring to FIG. 8A, upper and lower peripheral light emission parts 15 are illustrated and the right and left peripheral light emission parts 15 are omitted. The peripheral light emission parts 15 are arranged so as to protrude from the board face of the display 200. With this, the detection part 11 can detect an interruption of the light emitted by the peripheral light emission part 15 by the pointer 13 or the finger. Although the amount of protrusion from the board face is about 1 cm, the amount may be designed depending on the performance of the detection part 11. The amount of protrusion of the detection part 11 from the board face may be shorter or longer than 1 cm. If the pointer 13 or the finger 14 intrudes into the amount of protrusion without touching the display 200, the coordinate can be detected.

Figure 8B:
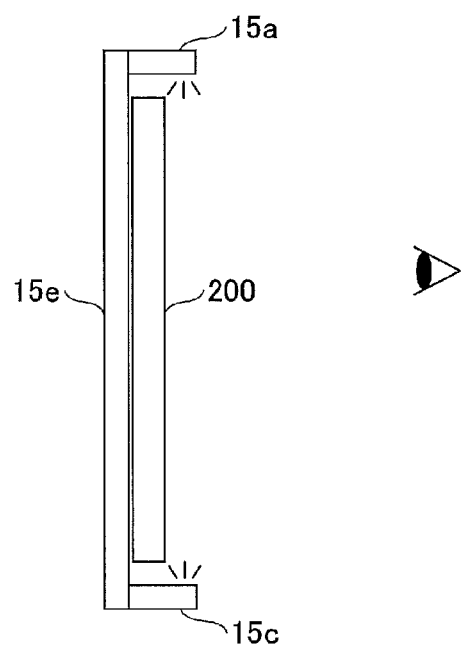

FIG. 8B illustrates an exemplary side view of the peripheral light emission part 15. Referring to FIG. 8B, four peripheral light emission parts 15 are connected to a backboard 15e. The four peripheral light emission parts 15 form edges of a rectangle when the four peripheral light emission parts 15 are connected to the backboard 15e. The peripheral light emission parts 15 are arranged so as to protrude from the board face of the display 200 in a manner similar to FIG. 8A. Positions where the peripheral light emission parts 15 are connected to the backboard 15e can be adjusted depending on the size of the display 200.

The direction of each detection part 10 on a surface parallel to the board face of the display 200 is fixed at an angle of 45° from the side adjacent to the detection part 10. Alternatively, the direction of each detection part 10 on the surface parallel to the board face of the display 200 is fixed to face the diagonally opposing vertex. By arranging as described above, two sides facing each detection part 11 may be included in the view angle of the detection part 11. In a case where the direction of each detection part 10 on the surface parallel to the board face of the display 200 is fixed at the angle of 45° from the side adjacent to the detection part 10, the view angle is at least 90° in order to include the two sides within the view angle.

By arranging the detection parts 11 having the above view angle, the detection part 11a can detect by including the peripheral light emission parts 15b and 15c in its view angle, the detection part 11b can detect by including the peripheral light emission parts 15c and 15d in its view angle, the detection part 11c can detect by including the peripheral light emission parts 15a and 15d in its view angle, and the detection part 11d can detect by including the peripheral light emission parts 15a and 15b in its view angle.

By arranging the detection parts 11 at the four corners on a rectangular detection area, it is possible to unify the view angles of all the detection parts 11 to be 90°. Thus, imaging optical systems for the detection parts 11 can have a similar design. In a case where the direction of each detection part 10 on the surface parallel to the board face of the display 200 is not fixed at the angle of 45° from the side adjacent to the detection part 10, it is preferable to provide a detection part 11 that can entirely include two sides facing the detection part 11 in its view angle.

The detection part 11 detects the light emitted by the peripheral light emission part 15. Because the coordinate is detected by using the interruption of the light by the pointer 13 or the hand, it is preferable that the light is evenly emitted from the peripheral light emission part 15. A light guide plate may be used as the light source evenly emitting the light.

FIG. 9 schematically illustrates the structure of the peripheral light emission part 15. The peripheral light emission part 15 is formed by arranging a prism sheet 161, a diffusion plate 162, a light guide plate 163, and a reflection film 164 in this order from a light-emitting face like layers. A light emitted from a light source 165 such as a lamp or a LED is input in a horizontal direction from a side surface of the light guide plate 163. The reflection film 164 is formed with reflection points 166. The thickness of the light guide plate 163 becomes thinner at a position farther from the light source. The light guide plate 163 becomes a surface light source after converting the light emitted from the light source 165. The light from the light guide plate 163 is diffused by the diffusion plate 162 and condensed by the prism sheet 161 to thereby form a bright and even light-emitting face.

This lighting method is called a side light method or an edge light method. This lighting method has an advantage that the peripheral light emission part 15 is formed to be thin because the light source 165 does not contribute the thickness of the peripheral light emission part 15. It is effective that the material of the light guide plate 163 is an acrylic resin having a high transparency.

Further, a direct emission type may be used instead of the side light type for the peripheral light emission part 15. In the direct emission type, the light from the light source is incident vertically on a diffusion plate to form an even light-emitting face.

[Calculation of Angle θ Based on Received Light Level]

Figure 10:
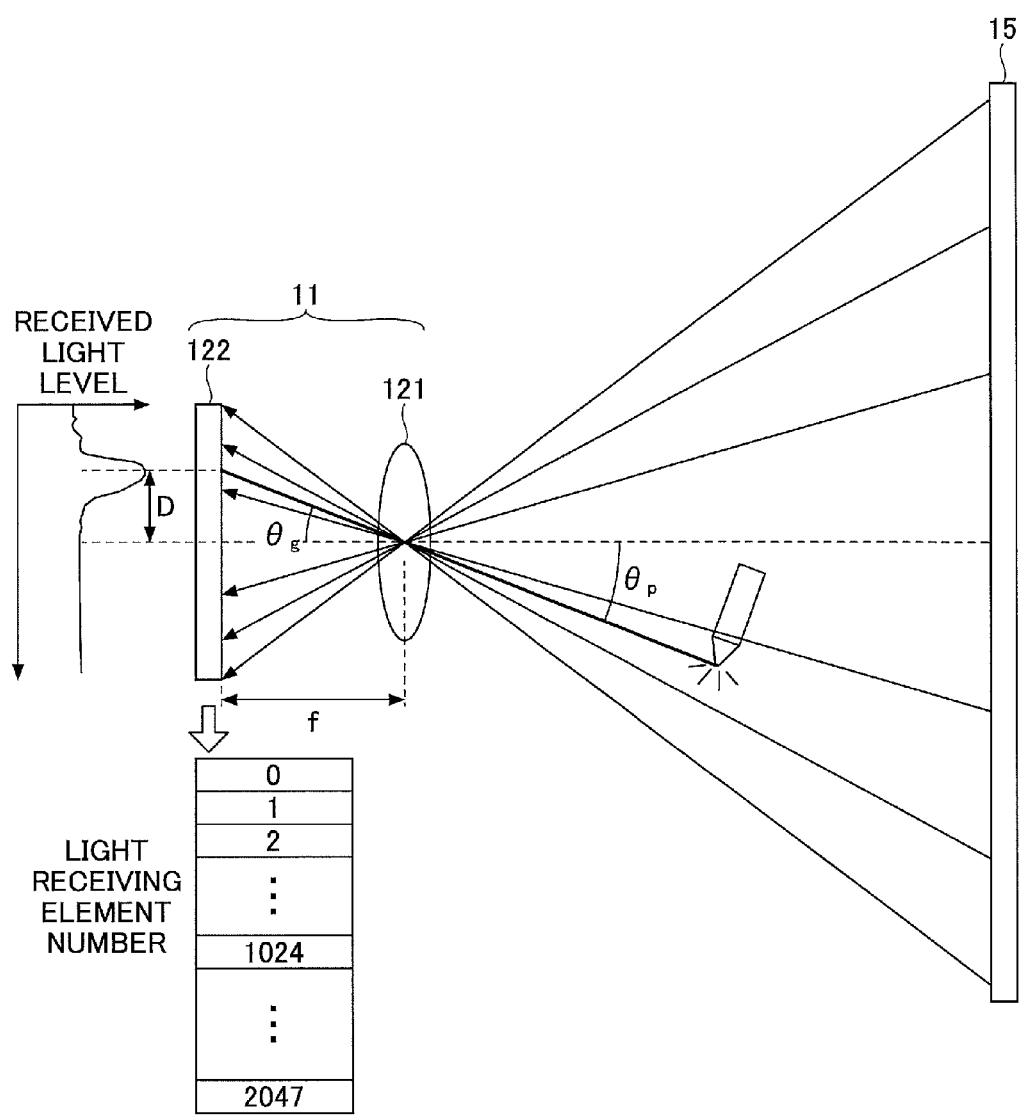
FIG. 10 schematically illustrates an internal structure of a detection part and a light emitted by the pointer and received by the detection part.

FIG. 10 schematically illustrates an exemplary internal structure of the detection part 11 and a light emitted by the pointer 13 and received by the detection part 11. The detection part 11 includes an imaging lens 121 for imaging the infrared light incident on the detection part 11 and a solid-state image sensor 122. The solid-state image sensor 122 is a CCD or a CMOS formed by aligning multiple light receiving element in a line. The solid-state image sensor 122 may be a two dimensional imaging element. A filter causing only the infrared light to penetrate may be provided between the imaging lens 121 and the peripheral light emission part 15.

Further, a light-receiving face of the solid-state image sensor 122 is arranged vertical to the board face of the display 200. The number of the light receiving elements arranged in one-dimensional alignment is 2048, and the center light receiving element is the 1024-th light receiving element.

The pointer 13 held by the user touches the display 200, the tip light emission part 130 of the pointer 13 emits the light. The infrared light emitted from the peripheral light emission part 15 and the infrared light emitted from the pointer 13 are incident on the imaging lens 121, pass through the imaging lens 121, and reaches the solid-state image sensor 122. When there is no interruption of the light, the 2048 light receiving elements of the solid-state image sensor 122 receive the light emitted from the peripheral light emission part 15, and simultaneously the light emitted by the tip light emission part 130 is received by the light receiving element corresponding to a position θp of the pointer 13. The received light level of the light receiving element receiving the light emitted by the tip light emission part 130 becomes distinctly great. Although it is not illustrated, when the finger 14 interrupts the light emitted from the peripheral light emission part 15, the received light level of the light receiving element corresponding to the position of the finger 14 becomes distinctly small.

As described, a light incident on the center of the imaging lens 121 at the right angle is received by the 1024-th light receiving element that exists at the center of the solid-state image sensor 122. A light incident on the center of the imaging lens 121 at an angle θp from the optical axis is refracted by the imaging lens 121 and is received by the light receiving lens 121 at an angle θg from the optical axis. Thus, the angle θg corresponds to the light receiving element of the solid-state image sensor 122 on a one-on-one relationship. Therefore, if the light receiving element whose received light level is locally maximum or locally minimum is known, the corresponding angle θp can be obtained.

At first, a gap D between the light receiving element whose received light level is locally maximum or locally minimum and the center of the imaging lens 121 is designated by a reference symbol D. The focal point distance of the imaging lens 121 is designated by a reference symbol f. Then, the angle θg is calculated as follows.

$$\theta g = \arctan(D/f) \qquad \text{[Formula 1]}$$

Because θp can be uniquely determined with respect to θg, if θg is known, θp can be obtained from θg. The focal point distance f is fixed for the imaging lens 121. Therefore, the coordinate calculation part 25 refers to, for example, a table where light receiving element numbers are associated with θp to determine θp from the light receiving element number.

[Calculation of Coordinate by Triangulation]

Referring to FIG. 2, if the angle θR (corresponding to θp in FIG. 10) of the pointer 13 or the finger 14 pointing one point on the display is obtained by the detection part 11c and the angle θL of the pointer 13 or the finger 14 pointing this point on the display is obtained by the detection part 11d, the coordinate can be calculated by the method of triangulation. As illustrated in FIG. 7, the distance between the centers of the solid-state image sensors 122 of the left and right detection parts 11d and 11c is designated by a reference symbol w. The distance w is a measurable value. Therefore, by using the reference symbol and Formula 1, a two dimensional coordinate (x, y) of the point pointed by the finger 14 or the pointer 13 is calculated as follows by the coordinate calculation part 25 using the principle of triangulation:

$$x = w \cdot \tan \theta R / (\tan \theta L + \tan \theta R) \qquad \text{[Formula 2]}$$

$$y = w \cdot \tan \theta L \cdot \tan \theta R / (\tan \theta L + \tan \theta R) \qquad \text{[Formula 3]}$$

Formulas 1-3 are assembled as a part of a function of the coordinate calculation part 25. Accordingly, if the light receiving element whose received light level is a peak value or a local minimum value can be specified, the coordinate (x, y) of the pointer 13 or the finger 14 can be calculated as a function of θL and θR.

[Signal Waveform]

Figure 11:
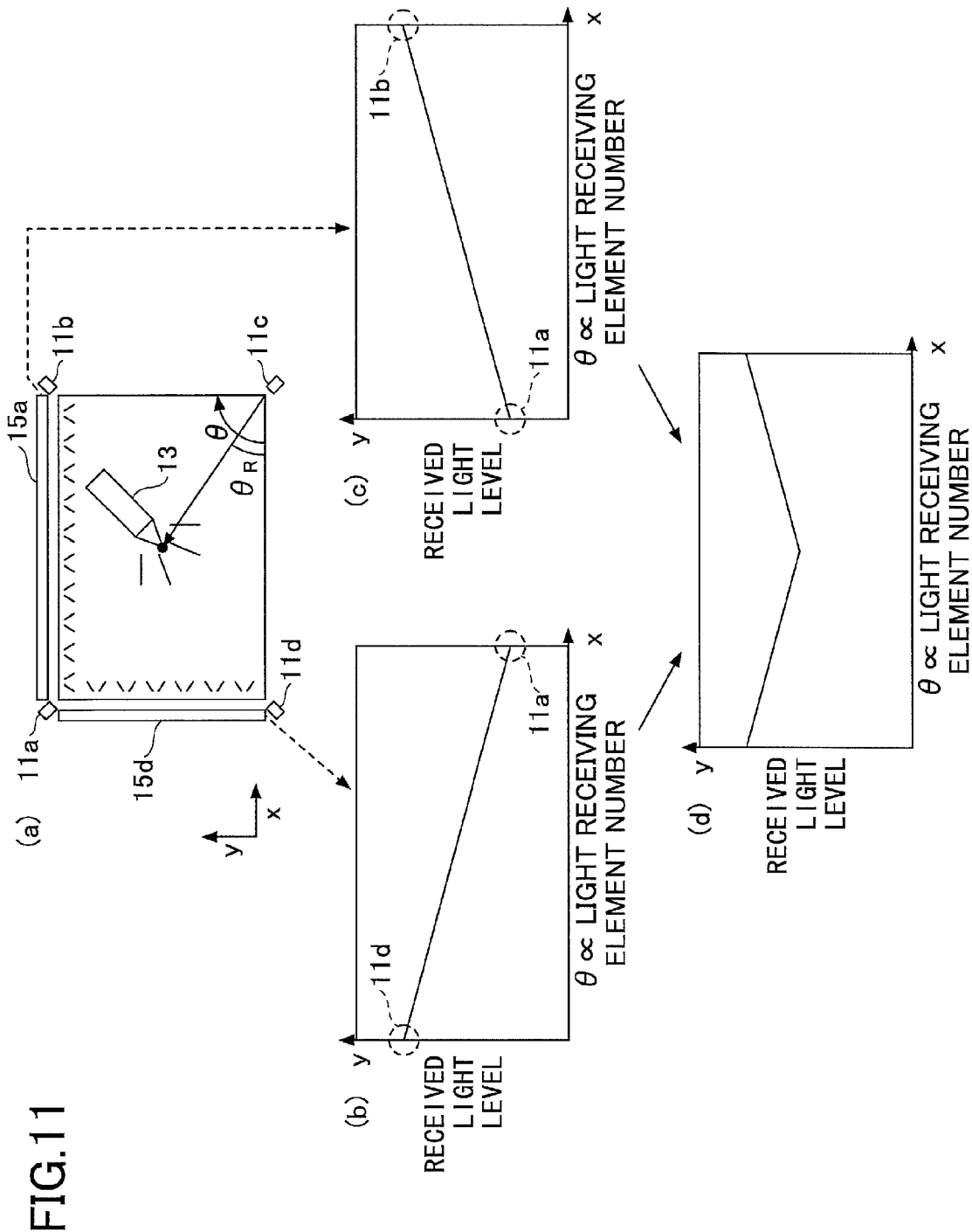
FIG. 11 schematically illustrates a received light level detected by the detection part.

FIG. 11 schematically illustrates the received light level detected by the detection parts 11. Referring to FIG. 11, (a) schematically illustrates the positions of the detection part 11c, the peripheral light emission parts 15a and 15d, and the pointer 13.

Referring to FIG. 11, (b) schematically illustrates the received light level when only the peripheral light emission part 15a emits the light with in the view angle of the detection part 11c. Referring to FIG. 11, (c) schematically illustrates the received light level when only the peripheral light emission part 15*d* emits the light with in the view angle of the detection part 11*c*. The abscissa axis x indicates the light receiving element number of the one-dimensional solid-state image sensor 122 included in the detection part 11*c*. The light receiving element number is converted to the angle θ. The ordinate axis y indicates the received light level.

When there is nothing interrupting the light emitted by the peripheral light emission part 15 (without the pointer 13 emitting the light and the finger 14), the light intensity of the light emitter by the peripheral light emission part 15 depends on a distance between the detection part 11 and the peripheral light emission part 15. The peripheral light emission part 15 uniformly emits the light and there is no direction dependency in light beams emitted by the peripheral light emission part 15. Therefore, within the areas of the peripheral light emission parts 15*d* and 15*a*, which is within the view angle of the detection part 11*c*, the light from the vicinities of the detection parts 11*b* and 11*d* has the highest intensity and the light from the vicinity of the detection part 11*a* has the lowest intensity.

Because the detection part 11*c* receives the lights emitted from the two peripheral light emission parts 15*a* and 15*d*, the received light level in the detection part 11*c* is obtained by combining the received light level in the peripheral light emission part 15*a* with the received light level in the peripheral light emission part 15*d*.

Referring to FIG. 11, (d) schematically illustrates the combination of the received light levels of the lights emitted from the two peripheral light emission parts 15*a* and 15*d*. The intensity distribution of the received light level is schematically illustrated and does not always match the actual intensity distribution. With respect to the received light level, by detecting the position having the local maximum value caused by the tip light emission part 130 of the pointer 13 emitting the light and the position having the local minimum value caused by the finger 14 or the like, it is possible to detects the coordinates of the pointer 13 and the finger 14. The local maximum area detecting part 21 and the local minimum area detecting part 22 holds the received light level of each light receiving element as thresholds. The threshold held by the local maximum area detecting part 21 is slightly greater than the received light levels of the light receiving elements (for example, a value greater by about 5% to 10% than the received light levels). The threshold held by the local minimum area detecting part 22 is slightly smaller than the received light levels of the light receiving elements (for example, a value smaller by about 5% to 10% than the received light levels).

In a conventional method of triangulation using the interruption of the infrared ray, a light receiving element having the received light level of substantially zero is detected and it is unnecessary to store the threshold for each light receiving element. Further, in the method of triangulation where only the penpoint emits the light, it is sufficient to detect a light receiving element having the received light level sufficiently greater than zero and unnecessary to store the threshold for each light receiving element. Within the first embodiment, the light receiving element detecting the light emitted by the pointer 13 can be specified by storing the threshold for each light receiving element, even if the light emitted by the peripheral light emission part 15 overlaps the light emitted by the pointer 13. Because the received light levels of the adjacent light receiving elements do not suddenly change, the threshold may not be held for each light receiving element and a commonly used threshold may be held for each group of the light receiving elements (for example, the group of several light receiving elements to several tens of light receiving elements).

The local maximum area detecting part 21 and the local minimum area detecting part 22 detect the received light level of the peripheral light emission part 15 at a time of starting up the coordinate detection system 500 and updates the threshold. Alternatively, the received light level of the peripheral light emission part 15 is detected at an arbitrary timing by a user operation and the threshold is updated. With this, an appropriate threshold can be held.

While the user uses the coordinate detection system 500, there is a possibility that a light receiving property of the detection part or a light intensity of the light emitted from the peripheral light emission part 15 changes. Therefore, it is preferable that the threshold is occasionally changed during a use of the coordinate detection system 500. If there is no significant difference between the received light level and the threshold, the received light level received by the local maximum area detecting part 21 or the local minimum area detecting part 22 is set as a new threshold. With this, even in a case where there is a temporal change in the light intensity, the appropriate threshold can be maintained and the coordinate can be detected.

FIG. 12 illustrates an exemplary light intensity distribution in a case where, for example, the finger other than the pointer 13 interrupts the light. FIG. 12 illustrates a state where the finger 14 interrupts the light. Because an interrupting object other than the pointer 13 does not have a light emitting function, the light beam from the peripheral light emission part 15 is interrupted before returning to the detection part 11. The light intensity distribution of the light detected by the detection part 11 can be observed such that a central portion of a place pointed by the finger 14 recesses to have a local minimum value.

Therefore, if the light receiving element corresponding to the local minimum value is specified, the angle θR (corresponding to θp in FIG. 10) can be determined as described above. The local minimum area detecting part 22 detects the light receiving elements Ei to Ej, whose light intensities are lower than the threshold that is indicated by a broken line. The local minimum position extraction part 24 determines, for example, the center of the light receiving elements Ei to Ej as a local minimum position. The coordinate calculation part 25 can determine the angle θR if the local minimum position is obtained.

In a manner similar thereto, because a local minimum value appears in the received light level detected by the detection part 11*d*, the angle θL can be determined. By obtaining the angles θL and θR, the coordinate (x, y) of the finger 14 within the detection area can be obtained using the ordinarily known method of triangulation as described below.

Figure 13:
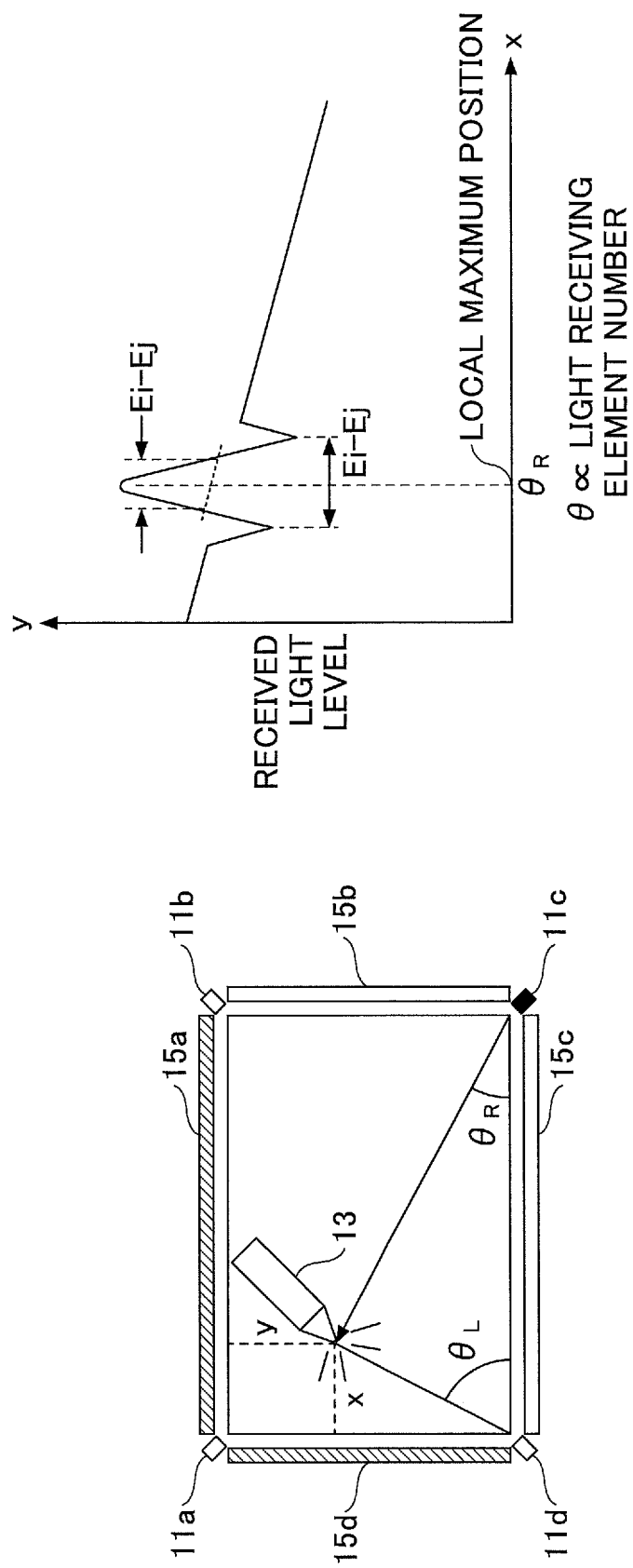
FIG. 13 illustrates an exemplary light intensity distribution in a case where the pointer emits the light.

FIG. 13 illustrates an exemplary light intensity distribution in a case where the pointer 13 emits the light. Because the light intensity of the light emitted by the light emission part of the pointer is higher than that of the light emitted by the peripheral light emission part 15, a peak higher than the light intensity of the light emitted by the peripheral light emission part 15 appears.

If the light receiving element corresponding to the peak is specified, the angle θR can be determined. Referring to FIG. 13, the local maximum area detecting part 21 detects the light receiving elements Ei to Ej, whose light intensities are higher than the threshold that is indicated by a broken line. The peak position extraction part 23 determines, for example, the center of the light receiving elements Ei to Ej as a peak position. The coordinate calculation part 25 can determine the angle θR if the peak position is obtained.

In a manner similar thereto, because the peak appears in the received light level detected by the detection part 11d, the angle θL can be determined. By obtaining the angles θL and θR, the coordinate (x, y) of the pointer 13 within the detection area can be obtained using the ordinarily known method of triangulation as described below.

As described above, the threshold can be optimized. The threshold may be the same as the received light level of the intensity distribution when the board face is pointed by nothing. In this case, the intensity distribution illustrated in (d) of FIG. 11 is compared with the intensity distribution illustrated in FIG. 12 or 13.

Further, within the first embodiment, the threshold can be optimized by holding the intensity distribution as illustrated in (d) of FIG. 11. Therefore, the received light level included in the intensity distribution illustrated in (d) of FIG. 11 and the received light level included in the intensity distribution illustrated in FIG. 12 or 13 are compared for each light receiving element. When these intensity distributions are accurately compared, the intensity distribution illustrated in FIG. 12 or 13 is subtracted from the intensity distribution illustrated in (d) of FIG. 11 for each light receiving element, and the light receiving element, whose result of the subtraction is not regarded as zero, is determined.

Referring to FIG. 13, there are drops of the received light level on both sides of the peak of the received light level caused by the pointer 13. The drops of the received light level is caused by an interruption of the light by a portion of the pointer 13 other than the tip light emission part 130 from the peripheral light emission part 15. Said differently, the peak of the received light level exists in a range interposed between the drops. Therefore, the peak position may be determined by the local maximum area detecting part 21 and the peak position extraction part 23 as follows.

The local maximum area detecting part 21 compares the received light intensity with the threshold in, for example, an ascending or descending order of the light receiving element number.

When the following conditions are satisfied, an area including the peak is detected: continuous areas having the received light level lower than the threshold are detected; continuous areas having the received light level higher than the threshold are detected; and continuous areas having the received light level lower than the threshold are detected. For example, areas Ei to Ej are detected between the minimum value in the first continuous area (an example of a first area in claims) having the received light level lower than the threshold and the minimum value in the second continuous area (an example of a second area in claims) having the received light level lower than the threshold. The peak position extraction part 23 determines, for example, the center of the light receiving elements Ei to Ej as the peak position.

Even if the continuous area having the received light level higher than the threshold is not detected, the peak position can be specified by detecting the two drops. If the peak position exists between the two drops, the peak position can be detected by the local maximum area detecting part 21 when the following conditions are satisfied: continuous areas having the received light level lower than the threshold are detected, and other continuous areas having the received light level lower than the threshold are detected again within a predetermined number of the light receiving elements. The peak position extraction part 23 determines the center of areas Ei to Ej between the minimum value of the first continuous areas having the received light level lower than the threshold and the minimum value of the second continuous areas having the received light level lower than the threshold as the peak position.

Even if the received light level is not higher than the threshold, the peak position can be determined by using the two drops of the received light level.

[Operation Procedure]

Figure 14A:
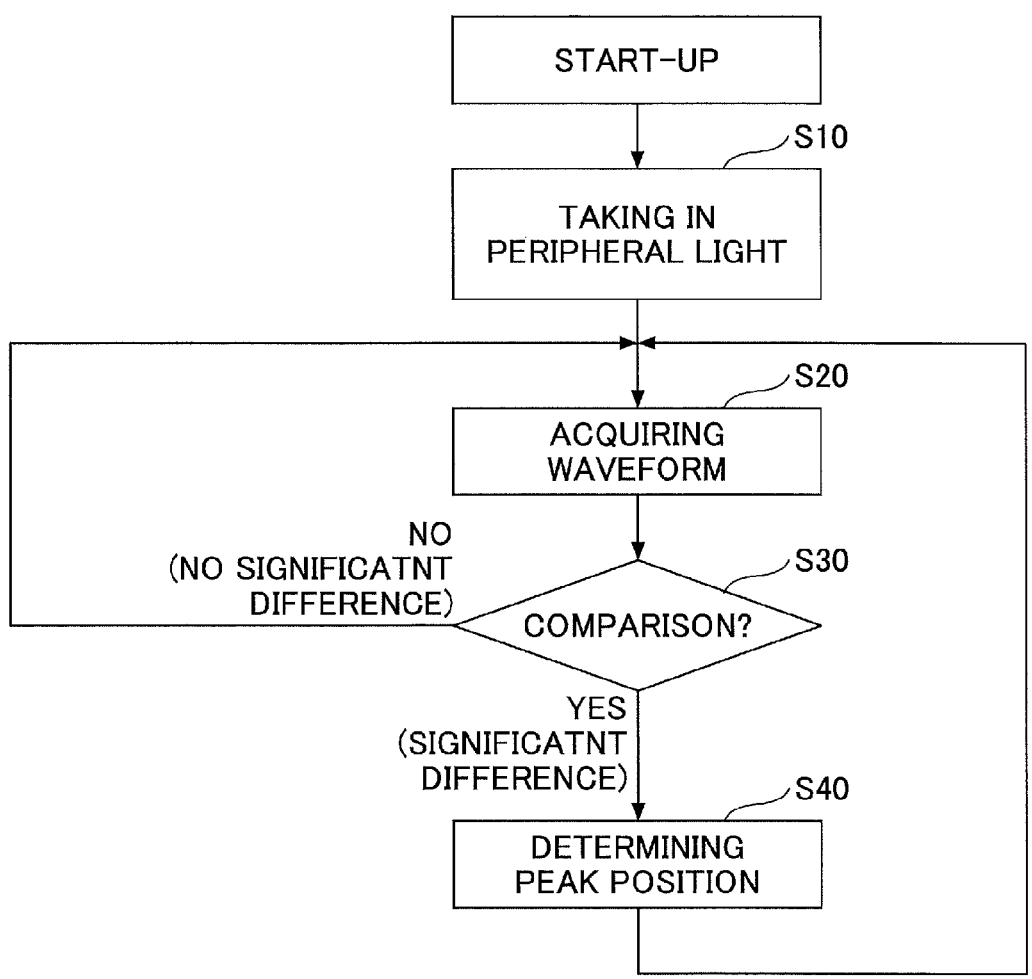
FIG. 14A is an exemplary flowchart illustrating a procedure of determining a peak position by the detection part and an application.

FIG. 14A is an exemplary flowchart illustrating a procedure of determining the peak position by the detection part 11 and an application. The process illustrated in FIG. 14A is started when the power source of the coordinate detection system 500 is turned on.

At first, the local maximum area detecting part 21 takes in the light emitted by the peripheral light emission part 15 in step S10. In a state where the finger 14 or the pointer 13 does not interrupt the light emitted from the peripheral light emission part 15, the received light level of the light emitted by only the peripheral light emission part 15 are taken in for each light receiving element. The taken in light level or a value slightly greater than the taken in light level is determined as the threshold. While the received light level to be the threshold is being taken in, it is preferable that the UI production part 30 displays a message such as "Do not touch the display" on the display 200.

When the received light level for the threshold is completely taken in, the local maximum area detecting part 21 acquires the received light level of each light receiving element in step S20.

The local maximum area detecting part 21 compares the stored threshold with the received light level thus acquired, and determines whether there is a significant difference between these in step S30.

If there is no significant difference in NO of step S30, the local maximum area detecting part 21 repeats the processes of steps S20 and S30.

If there is a significant difference in YES of step S30, the peak position extraction part 23 determines the center of the area corresponding to the significant difference as the peak position in step S50. Because the light receiving element number of the peak position is output to the coordinate calculation part 25, the coordinate pointed by the user using the pointer 13 is calculated.

Figure 14B:
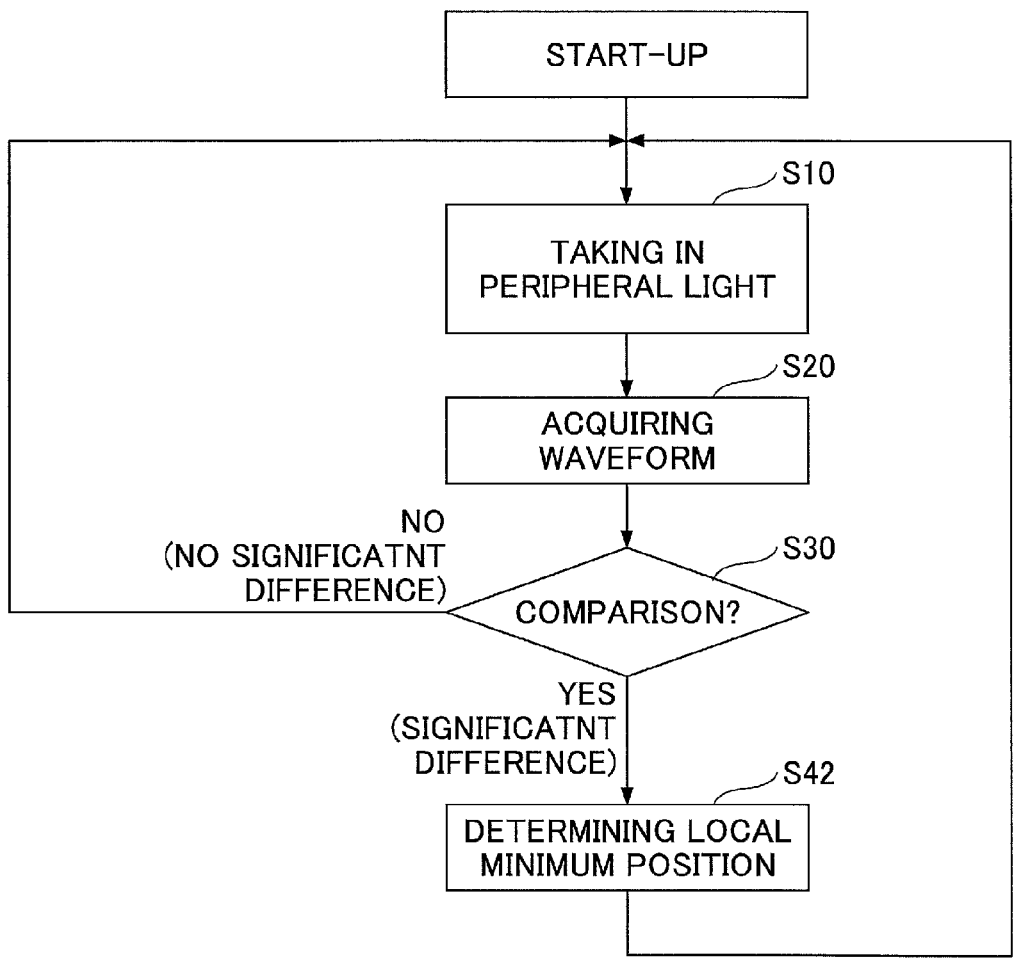
FIG. 14B is an exemplary flowchart illustrating a procedure of determining a local minimum position by the detection part and the application.

FIG. 14B is an exemplary flowchart illustrating a procedure of determining the local minimum position by the detection part 11 and the application.

At first, the local minimum area detecting part 22 takes in the light emitted by the peripheral light emission part 15 in step S10. In a state where the finger 14 or the pointer 13 does not interrupt the light emitted from the peripheral light emission part 15, the received light level of the light emitted by only the peripheral light emission part 15 are taken in for each light receiving element. The taken in light level or a value slightly smaller than the taken in light level is determined as the threshold.

When the received light level for the threshold is completely taken in, the local minimum area detecting part 22 acquires the received light level of each light receiving element in step S20.

The local minimum area detecting part 22 compares the stored threshold with the received light level thus acquired, and determines whether there is a significant difference between these in step S30.

If there is no significant difference in NO of step S30, the local minimum area detecting part 22 repeats the processes of steps S20 and S30.

If there is a significant difference in YES of step S30, the local minimum position extraction part 24 determines the center of the area corresponding to the significant difference as the local minimum position in step S50. Because the light receiving element number of the local minimum position is output to the coordinate calculation part 25, the coordinate pointed by the user using the pointer 13 is calculated.

[An Exemplary Screen Displayed on Display]

FIG. 15 schematically illustrates a combination of an UI image displayed on the display 200, a stroke image, and an output image. The image combination part 28 combines these three images, namely the UI image, the stroke image, and the output image, in a priority order initially set along a viewing direction. It is possible that the user displays an arbitrarily selected image at a forward position by giving a priority on the arbitrarily selected image or that a partial image is not combined.

Further, the image combination part 28 can display a stroke drawn by the pointer 13 and a stroke drawn by the finger 14 in different display modes. The stroke drawn by the pointer 13 and the stroke drawn by the finger 14 may be displayed in the same display mode. The image combination part 28 displays the stroke drawn by the pointer 13 using, for example, a solid line and the stroke drawn by the finger 14 using, for example, a blinking solid line. Instead, the image combination part 28 displays the stroke drawn by the pointer 13 using, for example, a black line and the stroke drawn by the finger 14 using, for example, a red line. Instead, the image combination part 28 displays the stroke drawn by the pointer 13 using, for example, a solid line and the stroke drawn by the finger 14 using, for example, a broken line. Such a change in the display mode is ordinarily selected from a user interface (UI) by the user. However, according to the first embodiment, the display mode of the stroke can be changed by switching over between the pointer 13 and the finger 14.

[Modified Example of Peripheral Light Emission Part]

Figure 16A:
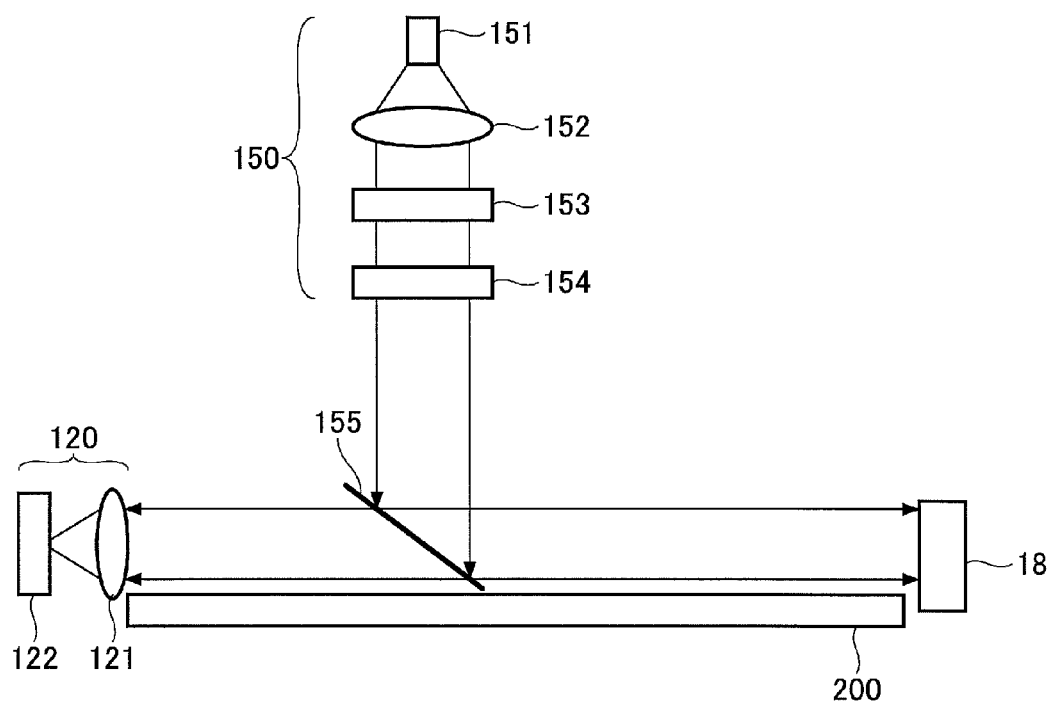
FIG. 16A schematically illustrates a structure of a detection part and a retroreflection member.

FIG. 16A schematically illustrates the structure of the detection part and a retroreflection member. As illustrated in FIG. 16A, the retroreflection member 18 that reflects the light may be provided to surround the display 200 instead of providing the peripheral light emission part 15.

The detection part 11 illustrated in FIG. 16A includes a lighting part 150 and a light receiving part 120. The lighting part 150 includes a light emitter 151. The light emitter 151 is a light source that can converge a beam spot to a certain extent such as a laser diode (LD) like a semiconductor laser, a pinpoint light emitting diode (LED), or the like. A light emitted from the light emitter 151 to the board face of the display 200 in a direction orthogonal to the board face is collimated in x direction by a cylindrical lens 152 that can change magnification in only one direction. The light collimated in x direction by the cylindrical lens 152 is converged in y direction by two cylindrical lenses 152 and 153 whose distributions of curvatures are perpendicular to the distribution of the curvature of the cylindrical lens 152. By the functions of a group of these cylindrical lenses 152, 153, and 154, an area converging the light emitted from the light emitter 151 like a line segment is formed in a backward side of the cylindrical lens 154. The light passing through the cylindrical lens 154 is turned by a half mirror 155 and travels along and over the board face of the display 200 in a form of parallel beam.

This parallel beam is recursively reflected by the retroreflection member 18, travels the same light path, and returns to the half mirror 155. The retroreflective light reflected by the retroreflection member 18 and returning the half mirror 155 penetrates the half mirror 155 and is incident on the light receiving part 120. Thereafter, the received light is processes as described above with reference to FIG. 10.

Figure 16B:
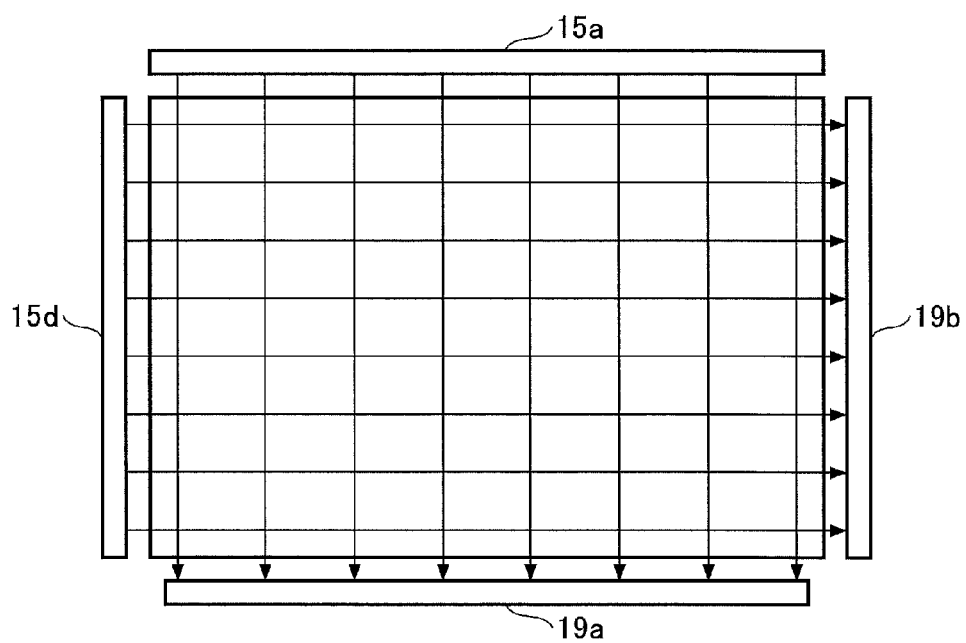
FIG. 16B schematically illustrates a structure of a detection part of a light interruption type.

FIG. 16B schematically illustrates the structure of a detection part of a light interruption type. Referring to FIG. 16B, two peripheral light emission parts 15a and 15b and two light receiving parts 19a and 19b are included. The peripheral light emission part 15a faces the light receiving part 19a, and the peripheral light emission part 15b faces the light receiving part 19b. In this, the light receiving parts 19a and 19b detect the coordinate of the finger using a light receiving element, from which the infrared light is not detected. When the tip light emission part 130 of the pointer 13 emits a light, in the light receiving elements included in the light receiving parts 19a and 19b, the received light level of the light receiving element closest to the pointer 13 has a peak. Therefore, local maximum area detecting part 21 compares the received light level with the threshold so that the area is roughly specified, and the peak position extraction part 23 determines the center of the area as the peak position.

As described, the peripheral light emission part 15 and the detection part 11 are not limited to the mode of the first embodiment as long as the position of the finger 14 is detected and the position of the pointer 13 is detected.

[Others]

Within the first embodiment, the display 200 is used as the display device. However, a projector may be used as the display device. In this case, the projector is connected to the display controller 113 illustrated in FIG. 3. The projector projects an image to an area surrounded by the peripheral light emission parts 15. The area surrounded by the peripheral light emission part 15 may be a whiteboard having no display function or a display 200 of the first embodiment.

Further, the display device may use a rear projection. In this case, the projector is connected to the display controller 113 illustrated in FIG. 3. This projector is provided to project the image on the back surface of a projecting surface.

Further, the display device may be a head up display (HUD). In this case, the projector is connected to the display controller 113 illustrated in FIG. 3. The projector projects a virtual image to an area surrounded by the peripheral light emission parts 15.

As described, the coordinate detection system 500 of the first embodiment detects the interruption of the light emitted from the peripheral light emission part 15 and the emission of the light from the pointer 13, and therefore both the coordinate of the pointer 13 and the coordinate of the finger 14 other than the pointer 13 can be obtained.

Therefore, the user can input the coordinate without a special pointer or with the special pointer.

Second Embodiment

Within a second embodiment, a light-on state of emitting a light and a light-out state of quenching the light in the peripheral light emission part 15 of the coordinate detection system 500 are cyclically switched over. The detection cycle performed by the detection part 11 includes the light-on state and the light-out state. Therefore, the detection part 11 can obtain the coordinate interrupted by the finger 14 in the light-on state and the coordinate of the pointer 14 emitting the light in the light-out state.

The emission intensity of the light emitted by the pointer 13 is not always optimally detected depending on the structure of the pointer 13, an angle change of the pointer 13 during transcription, or the like. Within the second embodiment, the coordinate of the pointer 13 emitting the light in the light-out state is detected to detect the coordinate of the pointed position.

Within the second embodiment, the structural elements having the same reference symbols in FIGS. 3 and 4 perform similar functions. Therefore, only major structural elements of the second embodiment may be described.

FIG. 17 is an exemplary sequential chart illustrating a relationship between a light-on cycle of the peripheral light emission part 15 and a cycle of detecting the local maximum area detecting part 21 and the local minimum area detecting part 22. While the peripheral light emission parts 15 are turned off (light-out), the local maximum area detecting part 21 detects the local maximum value. While the peripheral light emission parts 15 are turned on (light-on), the local maximum area detecting part 22 detects the local minimum value. In detecting the local maximum value, the threshold is the received light level (e.g., a value slightly greater than zero) in the light-out state of the peripheral light emission part 15. When the threshold is small, it becomes easier to detect the coordinate of the pointer 13 emitting the light. The threshold used to detect the local minimum value may be similar to that in the first embodiment.

Figure 18:
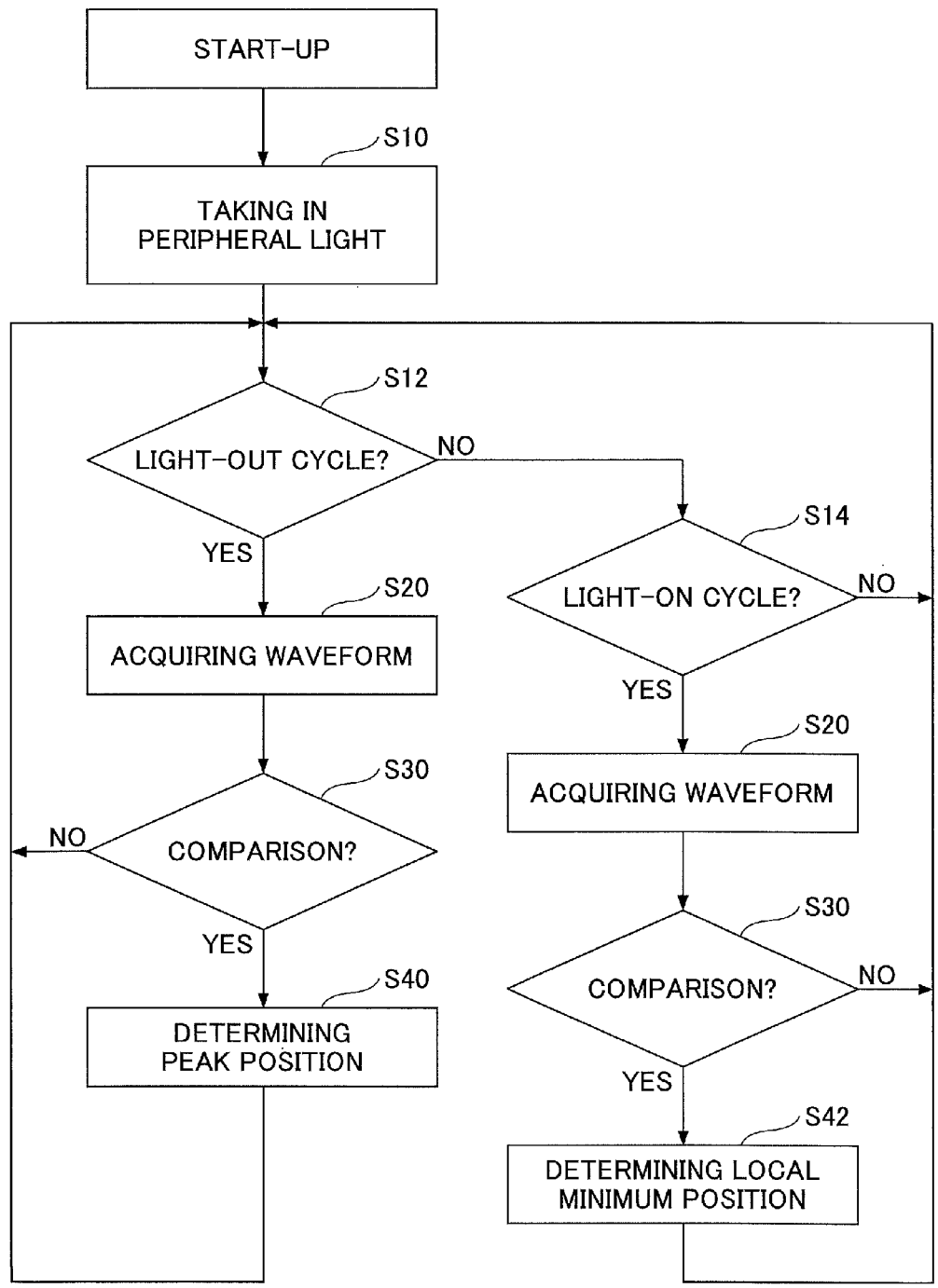
FIG. 18 is an exemplary flowchart illustrating a procedure of determining the peak position or the local minimum position by the detection part and the application.

FIG. 18 is an exemplary flowchart illustrating a procedure of determining the peak position or the local minimum position by the detection part and the application. The process illustrated in FIG. 14A is started when the power source of the coordinate detection system 500 is turned on.

At first, the local maximum area detecting part 21 takes in the light emitted by the peripheral light emission part 15 in step S10. In a state where the finger 14 or the pointer 13 does not interrupt the light emitted from the peripheral light emission part 15, the received light level of the light emitted by only the peripheral light emission part 15 are taken in for each light receiving element. This received light level is used as the threshold. While the received light level to be the threshold is being taken in, it is preferable that the UI production part 30 displays a message such as "Do not touch the display" on the display 200.

After the received light level to be the threshold is completely taken in, the local maximum area detecting part 21 determines whether a light-out (quenching) cycle of the peripheral light emission part 15 starts in step S12. The light-out cycle can be specified by monitoring the received light level, for example, at a time of determining the threshold in step S10. Instead, the light-out cycle may be previously held in the local maximum area detecting part 21 as a constant.

When the light-out cycle is started in YES of step S12, steps S20 to S40 are performed in a manner similar to the first embodiment illustrated in FIG. 14 to determine the peak position.

When the light-out cycle is not started in NO of step S12, the local minimum area detecting part 22 determines whether the light-on cycle of the peripheral light emission part 15 starts in step S14. The light-on cycle can be obtained in a manner similar to the light-out cycle.

When the light-on cycle is started in YES of step S14, steps S20 to S42 are performed in a manner similar to the first embodiment illustrated in FIG. 14 to determine the local minimum position.

In a time slot when the peripheral light emission part 15 does not emit the light, there is inconvenience in that the coordinate cannot be detected without using the pointer 13. Said differently, there is a time slot when the user cannot input the coordinate using the finger 14. In this time slot, the accuracy of the coordinate may be lowered. However, depending on the length of the time slot without the emission of the light from the peripheral light emission part 15, the accuracy of the coordinate may not be lowered.

Therefore, within the second embodiment, it is preferable to limit the usage of the coordinate detection without the pointer 13 to that requires less accuracy than in the detection of the coordinate with the pointer 13. For example, a gesture input or the like requires less accuracy than a stroke for a character or a symbol. Therefore, the operation determination part 26 receives the coordinate input by the finger 14 as the gesture and receives the coordinate input by the pointer 13 as the stroke. With this, the coordinate of the finger 14 or the like can be detected with a practically effective accuracy of detecting the coordinate.

Regardless of the use of the pointer, it is possible to provide a coordinate detection system where the coordinate pointed on the board face can be detected.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a coordinate detection system has been described in detail, it should be understood that various changes, substitutions, and alterations could be made thereto without departing from the spirit and scope of the invention.

This application is based upon and claims the benefit of priority of the prior Japanese Patent Application No. 2013-190395, filed on Sep. 13, 2013, the entire contents of which are incorporated herein by reference.

What is claimed is:

1. A coordinate detection system that detects a coordinate pointed by a pointing operation on a board face, the coordinate detection system comprising:
   at least two light receivers that receive a light from a peripheral light emitter provided in a periphery of the board face; and
   a coordinate detector that detects the coordinate pointed by the pointing operation based on a comparison between a first intensity distribution and a second intensity distribution,
   wherein the first intensity distribution is obtained by the at least two light receivers of receiving the light from the peripheral light emitter without an interruption of the light caused by the pointing operation,
   wherein the second intensity distribution is obtained by the at least two light receivers of receiving the light emitted from the peripheral light emitter when the pointing operation points the board face,
   wherein the first intensity distribution and the second intensity distribution are distributions of received light levels for light receiving elements that are included in each of the at least two light receivers and arranged in a longitudinal direction of each of the at least two light receivers,
   wherein the coordinate detector detects the coordinate pointed by a first pointer that is configured to emit the light in an area where the received light level of the light receiving element is greater than a first threshold that is set for each light receiving element, and
   wherein the coordinate detector detects the coordinate pointed by a second pointer that is not configured to emit the light in an area where the received light level of the light receiving element is smaller than a second threshold that is set for each light receiving element.

2. The coordinate detection system according to claim 1, wherein the coordinate detector detects the coordinate pointed by the pointing operation by comparing the received light levels of the first intensity distribution with the received light levels of the second intensity distribution for each light receiving element.

3. The coordinate detection system according to claim 1, wherein the second threshold is smaller than the first threshold.

4. The coordinate detection system according to claim 1, wherein, when the peripheral light emitter cyclically emits and quenches the light, the coordinate detector compares the received light level of the second intensity distribution in a time slot while the peripheral light emitter quenches the light with a third threshold for each light receiving element to determine whether the received light level of the second intensity distribution is greater than the third threshold, and compares the received light level of the second intensity distribution in a time slot while the peripheral light emitter lights the light with the second threshold for each light receiving element to determine whether the received light level of the second intensity distribution is smaller than the second threshold.

5. The coordinate detection system according to claim 1, wherein, when the second intensity distribution includes a first area where the received light levels of the light receiving elements, which are continuously adjacent, are lower than the first threshold and a second area where the received light levels of the light receiving elements, which are continuously adjacent, are lower than the first threshold, and the second area is positioned within a predetermined distance from the first area,
the coordinate detector detects the coordinate pointed by the pointing operation using the first pointer that is configured to emit the light based on a center portion positioned between the first area and the second area.

6. The coordinate detection system according to claim 1, wherein the board face is in a shape of a quadrangle, and
the at least two light receivers are four light receivers respectively provided in each of four corners of the quadrangle.

7. The coordinate detection system according to claim 1, wherein, in the first pointer, a light emitter is installed within a predetermined range from an end of the first pointer,
wherein the at least two light receivers detect a received light level obtained by superposing a light emission intensity of the light emitted by the light emitter on a light emission intensity of the light from the peripheral light emitter.

8. The coordinate detection system according to claim 7, wherein the light emission intensity of the light emitted by the light emitter of the first pointer is higher than the light emission intensity of the light from the peripheral light emitter.

9. The coordinate detection system according to claim 7, wherein the light emitter of the first pointer emits the light when the end of the first pointer is pressed and quenches the light when the end of the first pointer is not pressed.

10. The coordinate detection system according to claim 7, wherein the first pointer includes
a sender that sends a pressure signal when the end is pressed,
wherein the light emitter constantly emits the light,
the coordinate detection system further includes an operation receiver that receives an operation based on the coordinate detected by the coordinate detector,
wherein the operation receiver receives different operations depending on whether the coordinate is detected by the coordinate detector when the operation receiver receives or does not receive the pressure signal.

11. An information processing apparatus that detects a coordinate pointed by a pointing operation on a board face, the information processing apparatus comprising:
a coordinate detector that detects the coordinate pointed by the pointing operation based on a comparison between a first intensity distribution and a second intensity distribution,
wherein the first intensity distribution is obtained by at least two light receivers of receiving a light from a peripheral light emitter provided in a periphery of the board face without an interruption of the light caused by the pointing operation,
wherein the second intensity distribution is obtained by the at least two light receivers of receiving the light from the peripheral light emitter when the pointing operation points the board face,
wherein the first intensity distribution and the second intensity distribution are distributions of received light levels for light receiving elements that are included in each of the at least two light receivers and arranged in a longitudinal direction of each of the at least two light receivers,
wherein the coordinate detector detects the coordinate pointed by a first pointer that is configured to emit the light in an area where the received light level of the light receiving element is greater than a first threshold that is set for each light receiving element, and
wherein the coordinate detector detects the coordinate pointed by a second pointer that is not configured to emit the light in an area where the received light level of the light receiving element is smaller than a second threshold that is set for each light receiving element.

12. The information processing apparatus according to claim 11, wherein the coordinate detector detects the coordinate pointed by the pointing operation by comparing the received light levels of the first intensity distribution with the received light levels of the second intensity distribution for each light receiving element.

13. The information processing apparatus according to claim 11, wherein the second threshold is smaller than the first threshold.

14. The information processing apparatus according to claim 11, wherein, when the peripheral light emitter cyclically emits and quenches the light, the coordinate detector compares the received light level of the second intensity distribution in a time slot while the peripheral light emitter quenches the light with a third threshold for each light receiving element to determine whether the received light level of the second intensity distribution is greater than the third threshold, and compares the received light level of the second intensity distribution in a time slot while the peripheral light emitter lights the light with the second threshold for each light receiving element to determine whether the received light level of the second intensity distribution is smaller than the second threshold.

15. The information processing apparatus according to claim 11, wherein, when the second intensity distribution includes a first area where the received light levels of the light receiving elements, which are continuously adjacent, are lower than the first threshold and a second area where the received light levels of the light receiving elements, which are continuously adjacent, are lower than the first threshold, and the second area is positioned within a predetermined distance from the first area, the coordinate detector detects the coordinate pointed by the pointing operation using the first pointer that is configured to emit the light based on a center portion positioned between the first area and the second area.

16. The information processing apparatus according to claim 11, wherein the at least two light receivers are four light receivers respectively provided in four corners of the quadrangle.

17. The coordinate detection system according to claim 1, wherein the second pointer that is not configured to emit the light is a finger.

18. The information processing apparatus according to claim 11, wherein the second pointer that is not configured to emit the light is a finger.

\* \* \* \* \*